Nov. 11, 1952   C. G. HOLSCHUH ET AL   2,617,982
RADIO GUN CONTROL SYSTEM
Filed April 30, 1942   12 Sheets-Sheet 5
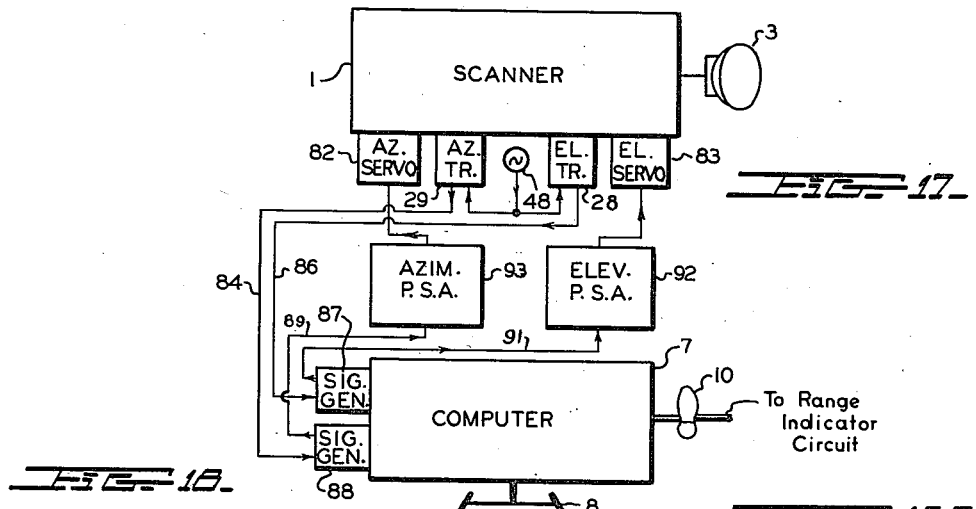
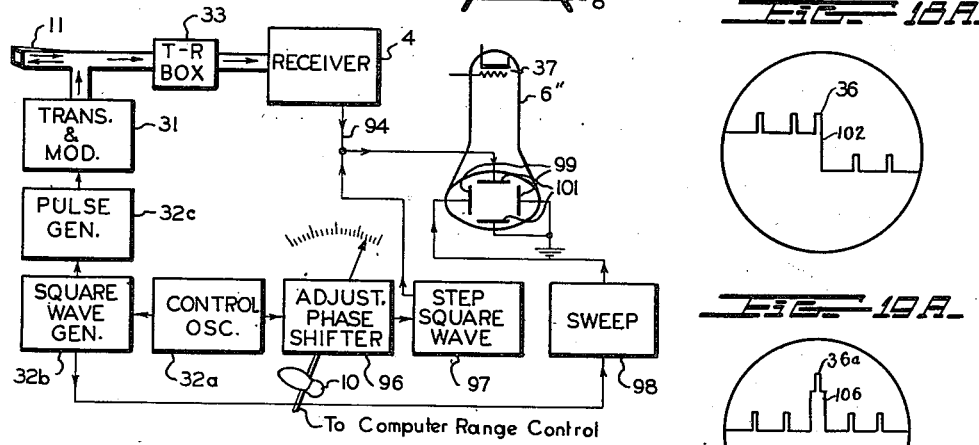
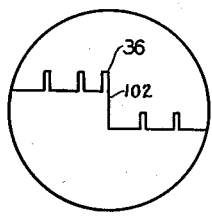
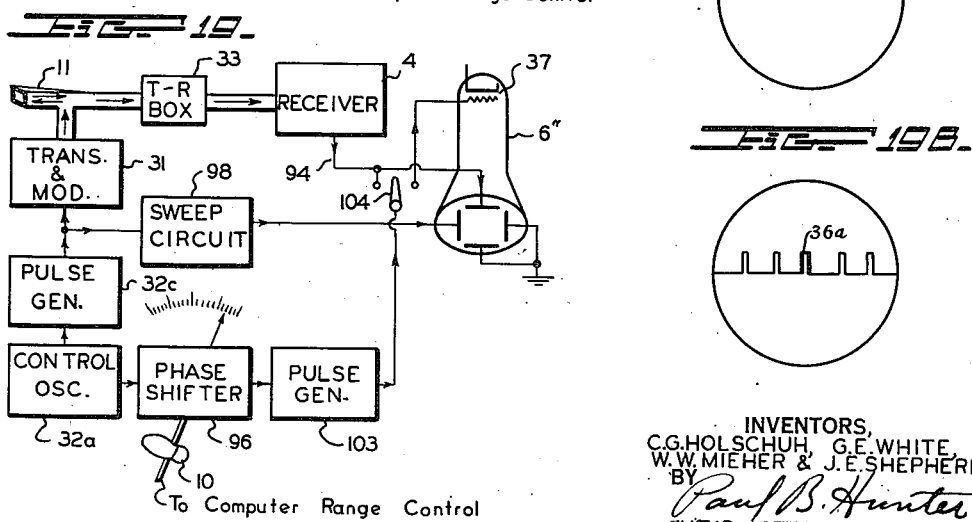
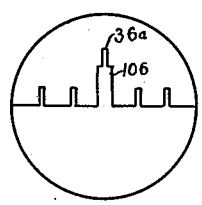
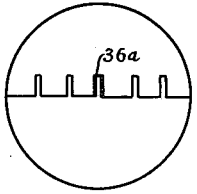
INVENTORS,
C.G. HOLSCHUH, G.E. WHITE,
W.W. MIEHER & J.E. SHEPHERD,
BY Paul B. Hunter
THEIR ATTORNEY.

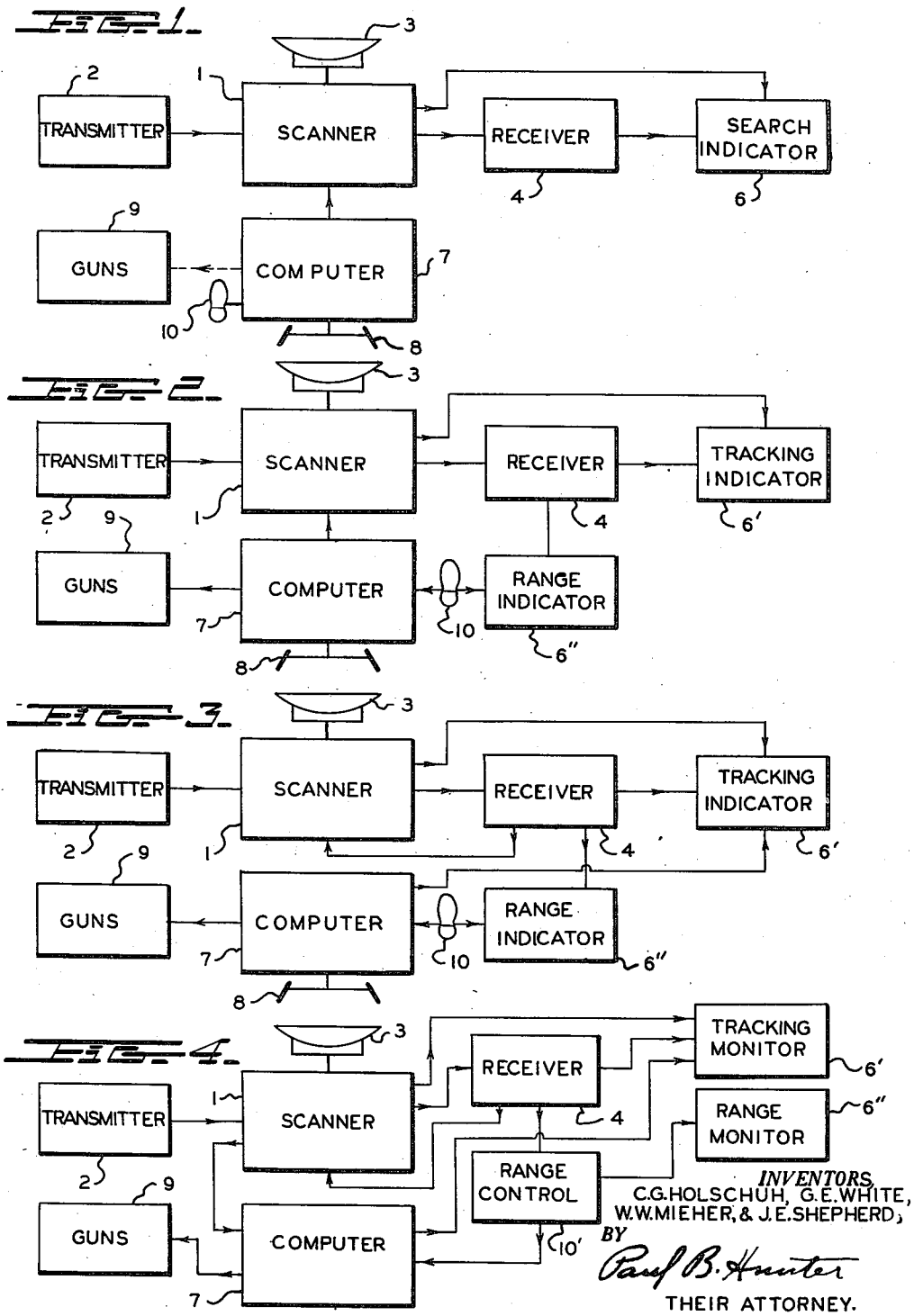

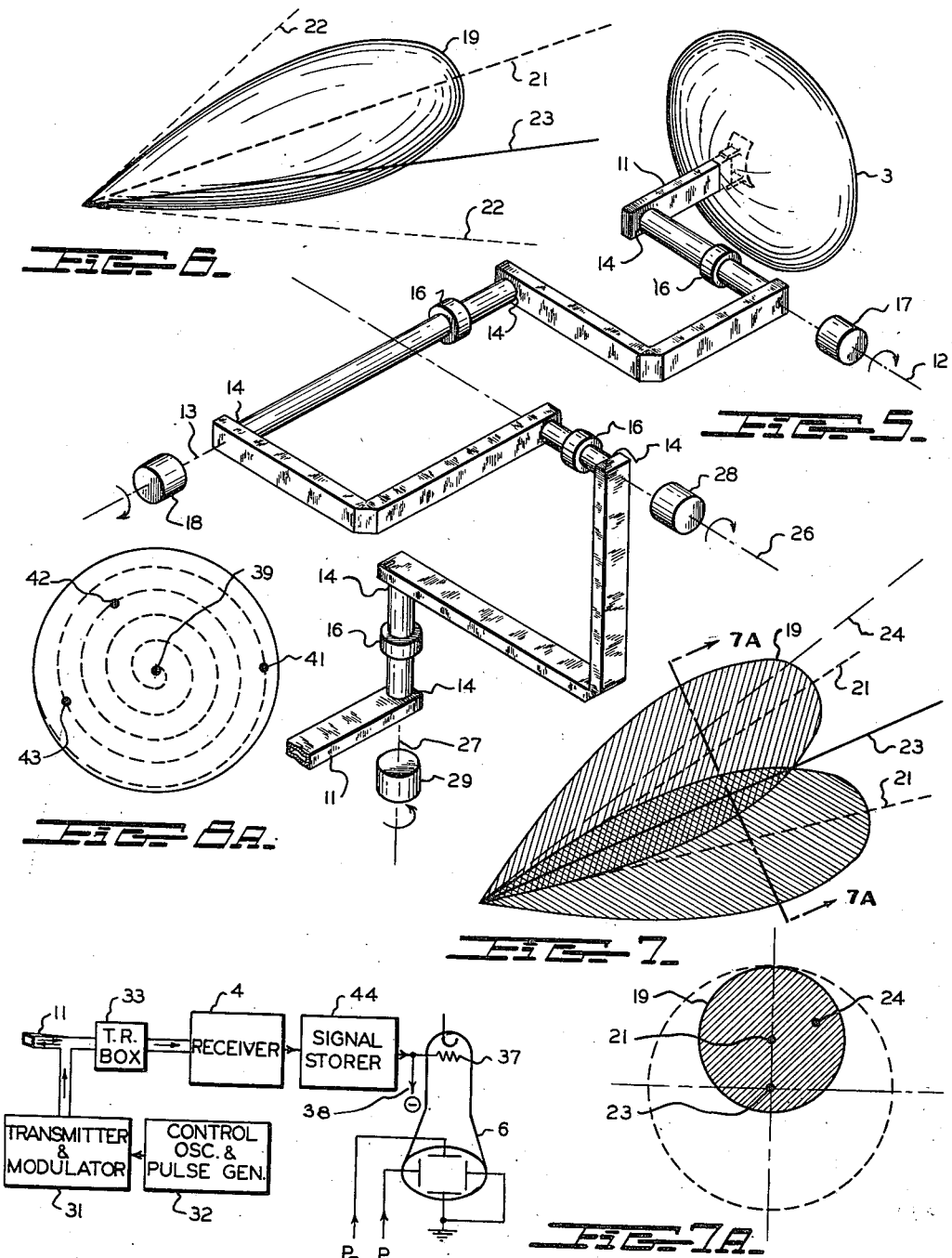

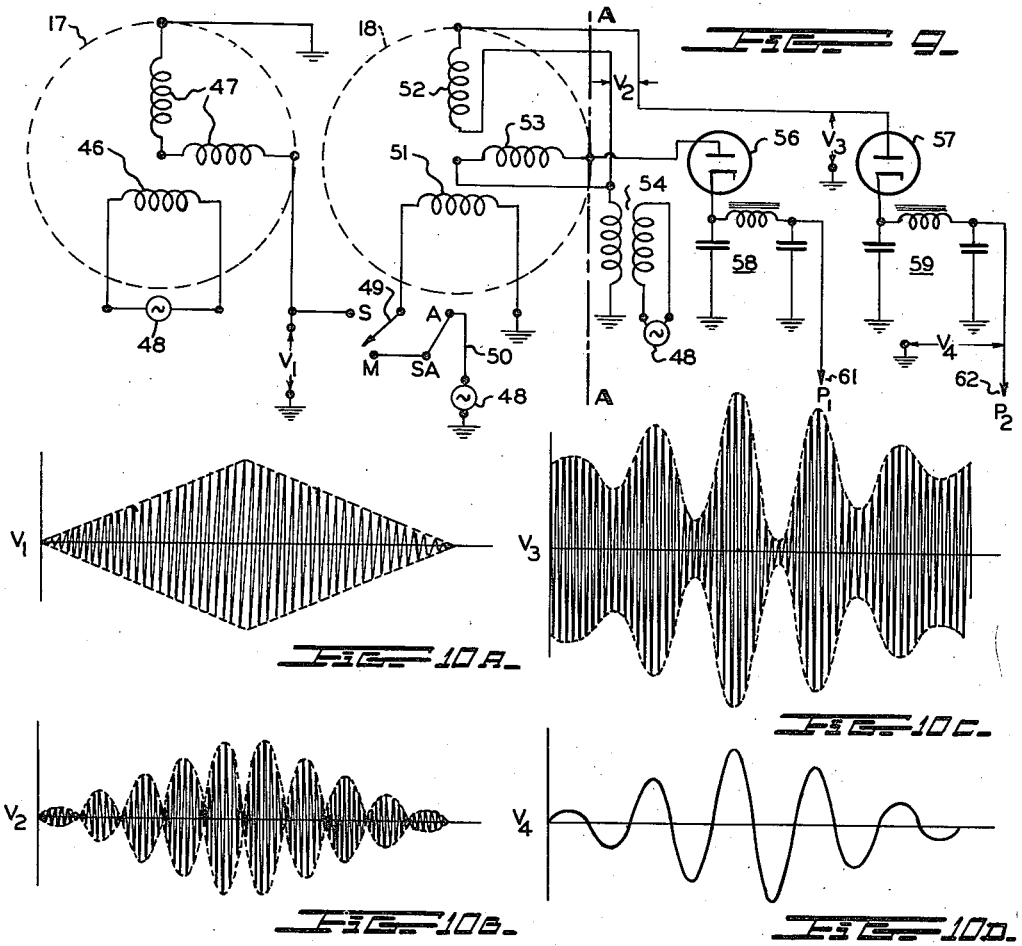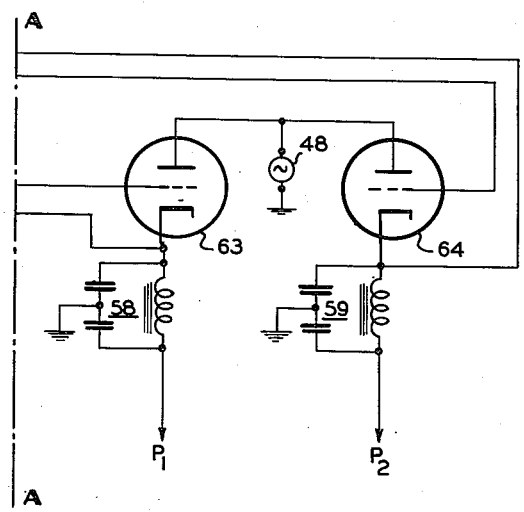

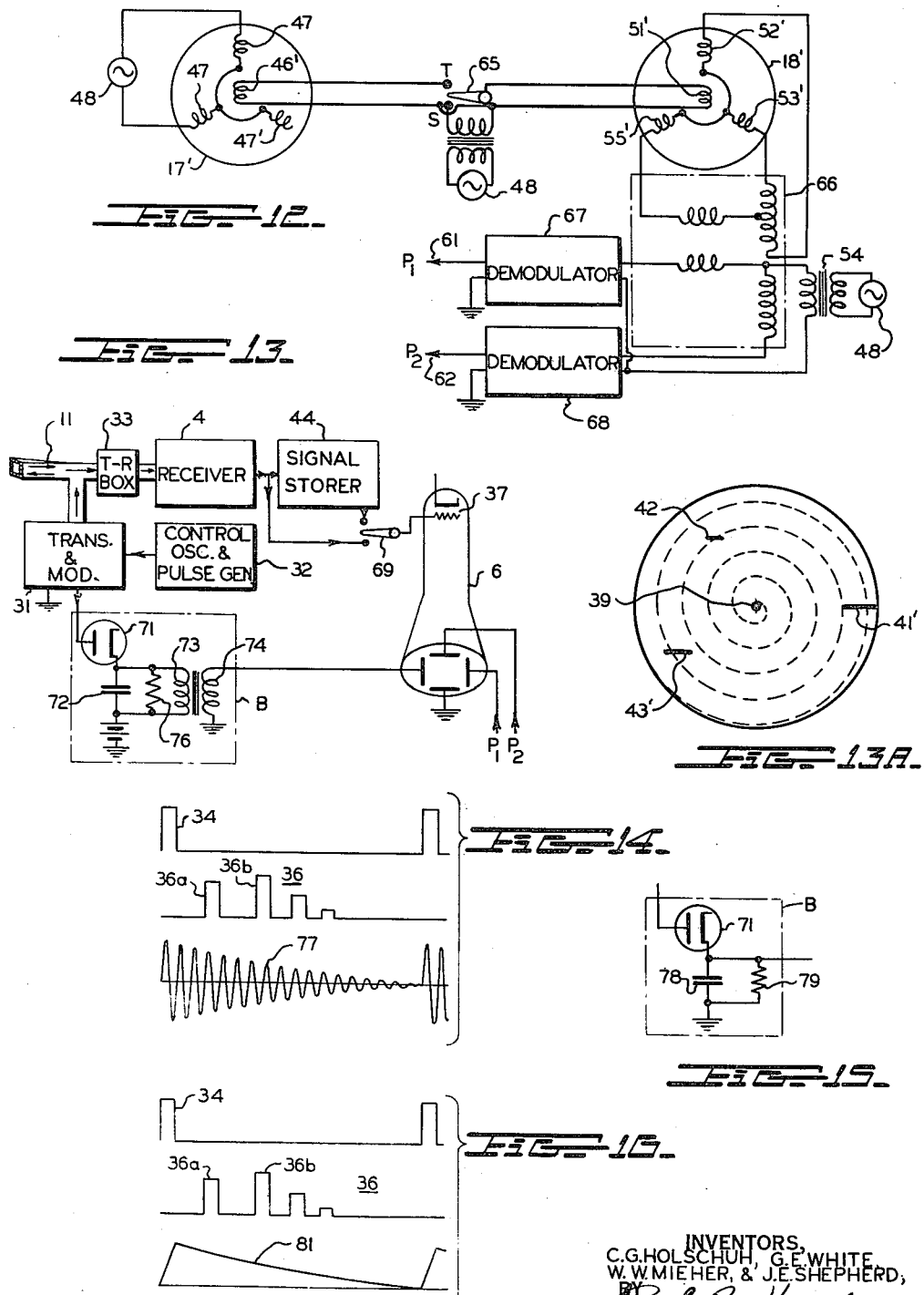

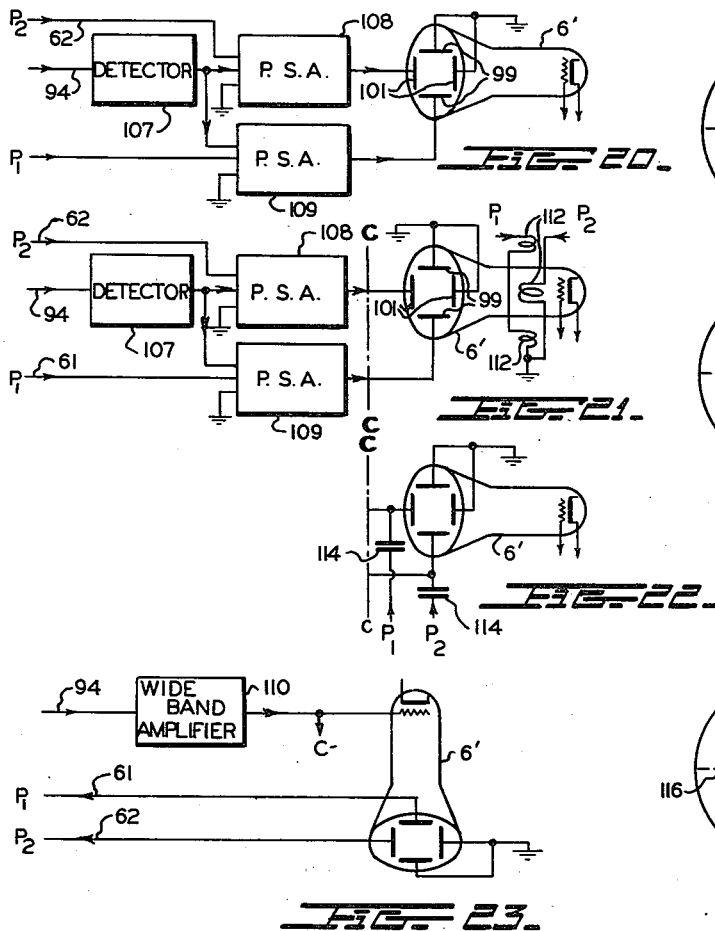

Nov. 11, 1952   C. G. HOLSCHUH ET AL   2,617,982
RADIO GUN CONTROL SYSTEM
Filed April 30, 1942   12 Sheets-Sheet 7

INVENTORS,
C.G.HOLSCHUH, G.E.WHITE,
W.W.MIEHER, & J.E.SHEPHERD,
BY Paul B. Hunter
THEIR ATTORNEY.

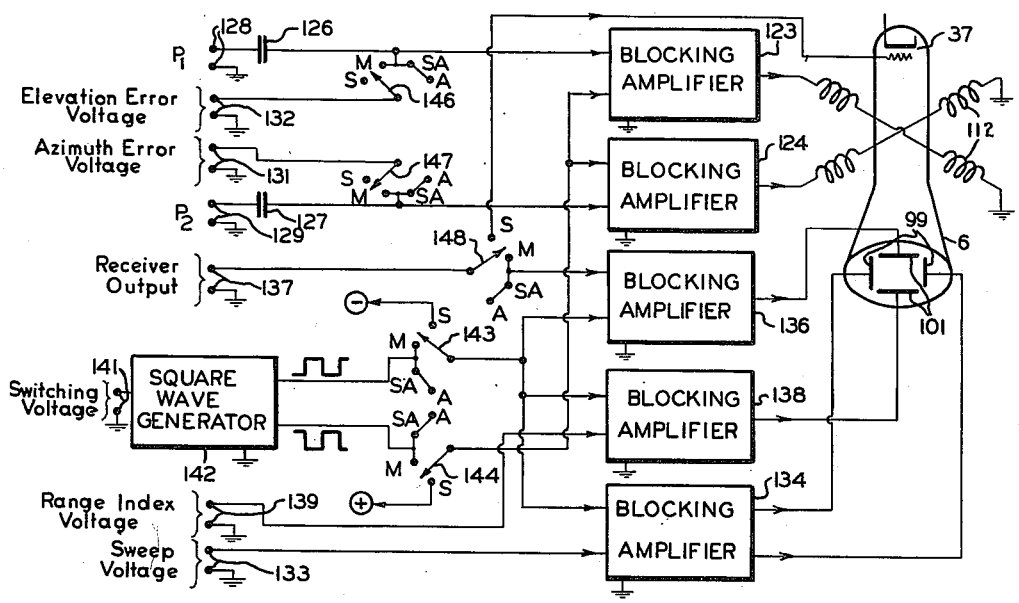
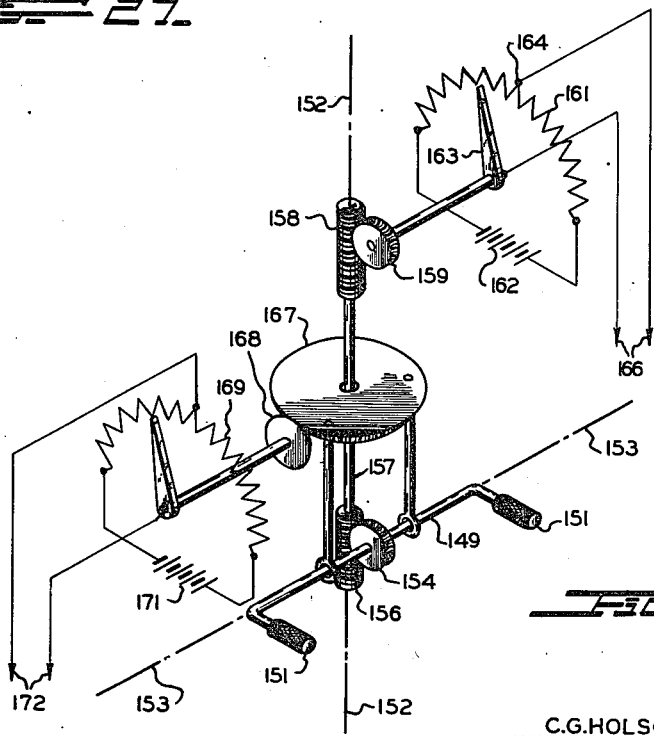

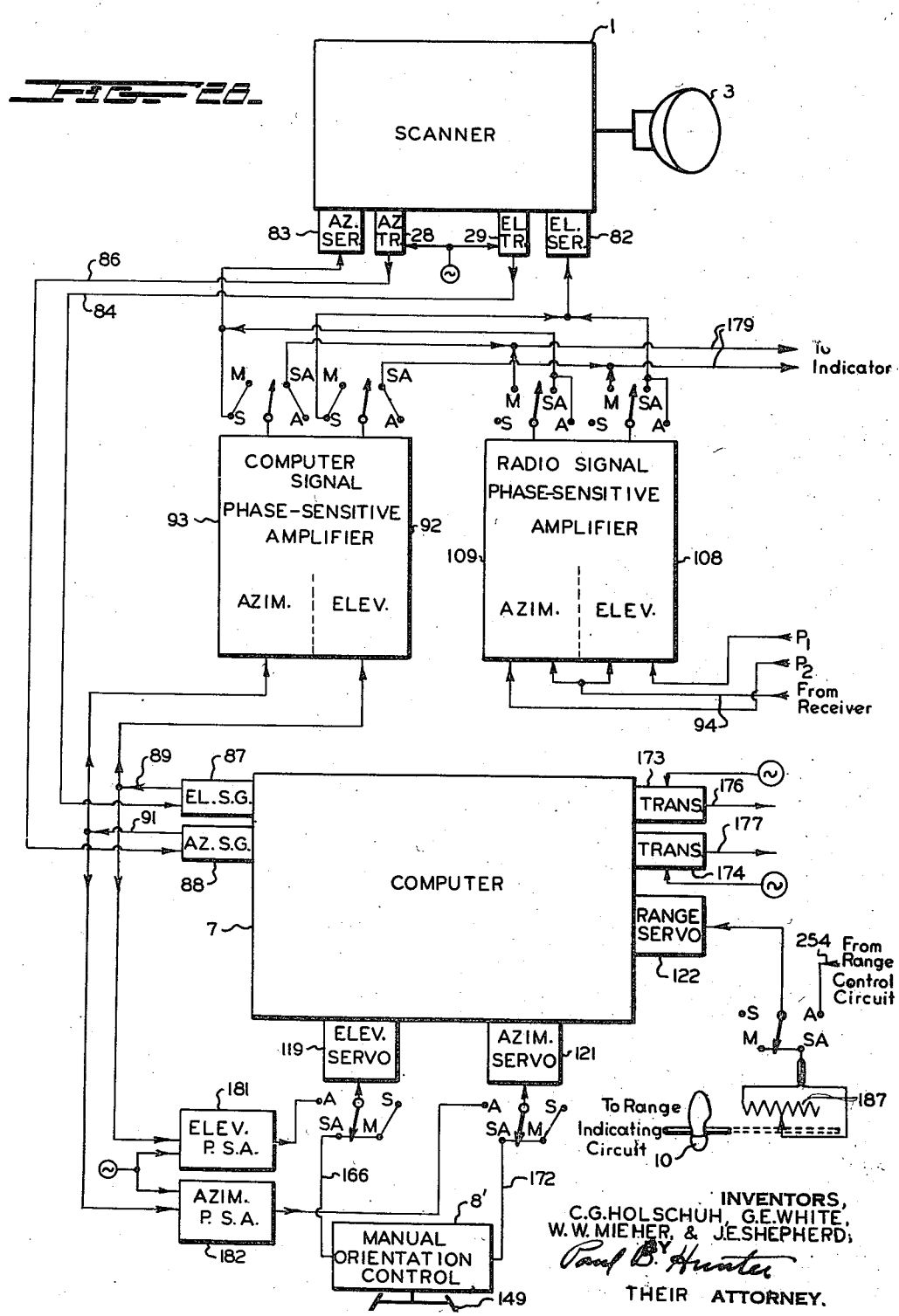

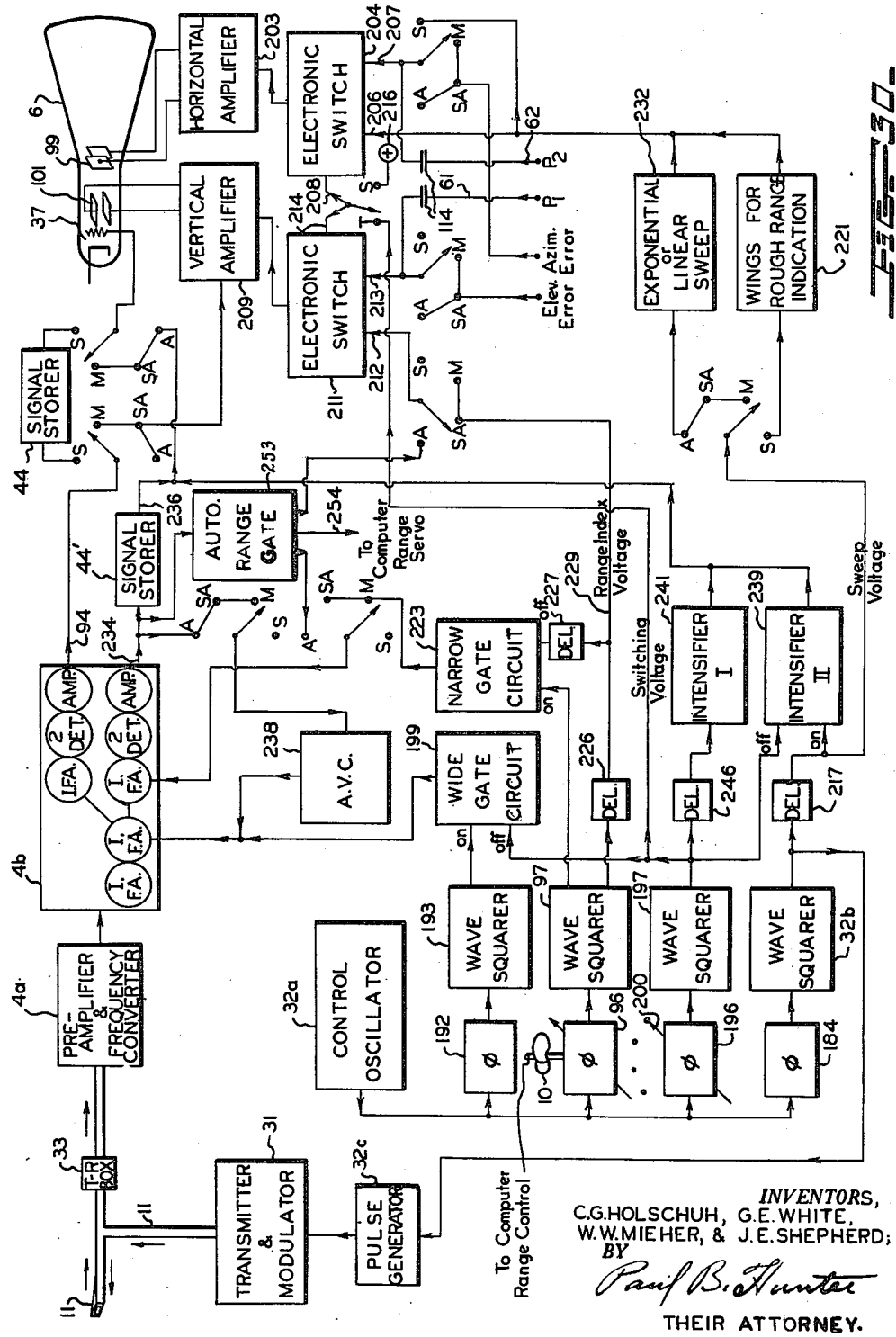

Nov. 11, 1952 C. G. HOLSCHUH ET AL 2,617,982
RADIO GUN CONTROL SYSTEM
Filed April 30, 1942 12 Sheets-Sheet 11
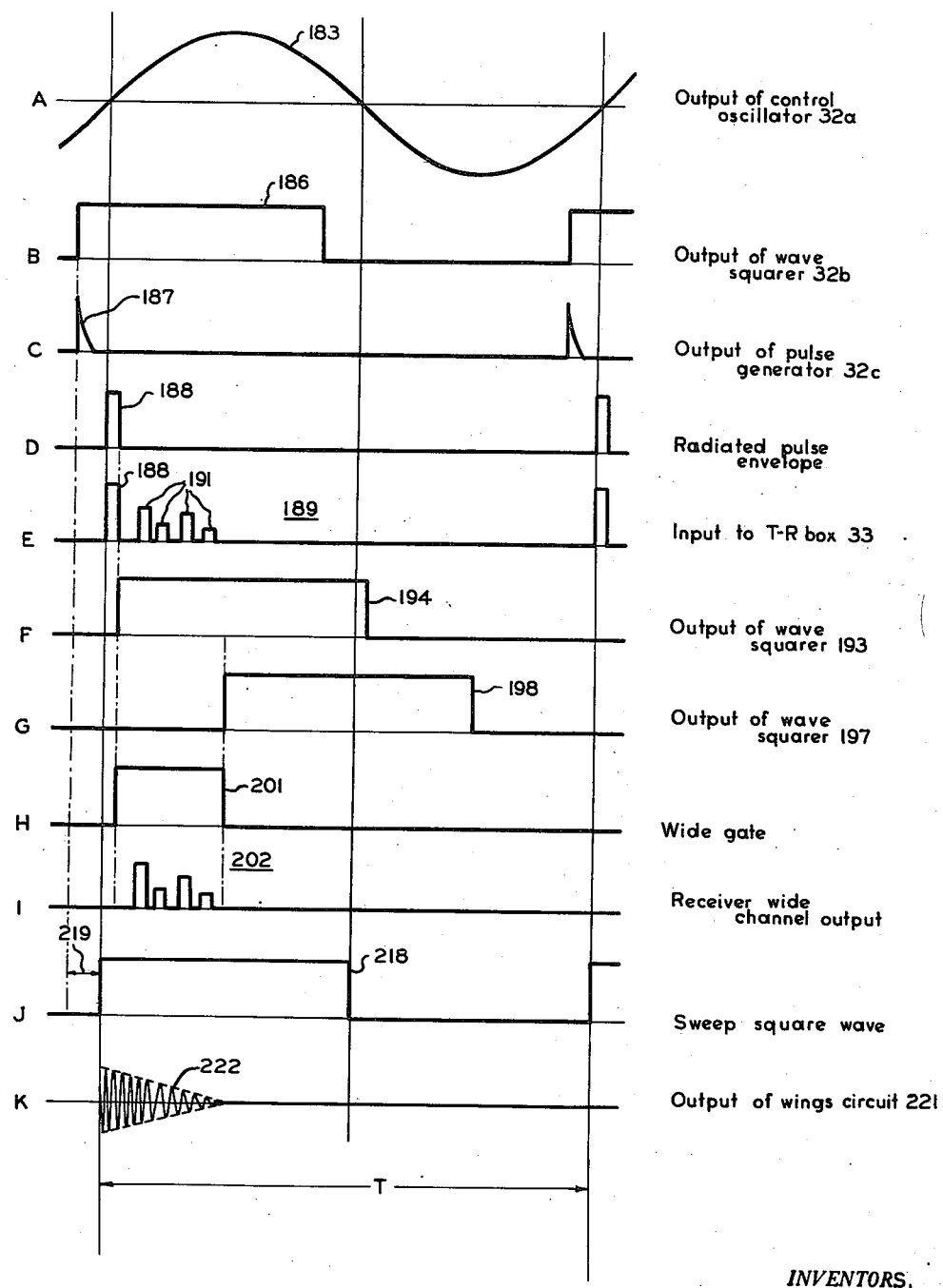
INVENTORS,
C.G.HOLSCHUH, G.E.WHITE,
W.W.MIEHER, & J.E.SHEPHERD;
BY
THEIR ATTORNEY.

Nov. 11, 1952     C. G. HOLSCHUH ET AL     2,617,982
RADIO GUN CONTROL SYSTEM
Filed April 30, 1942     12 Sheets-Sheet 12
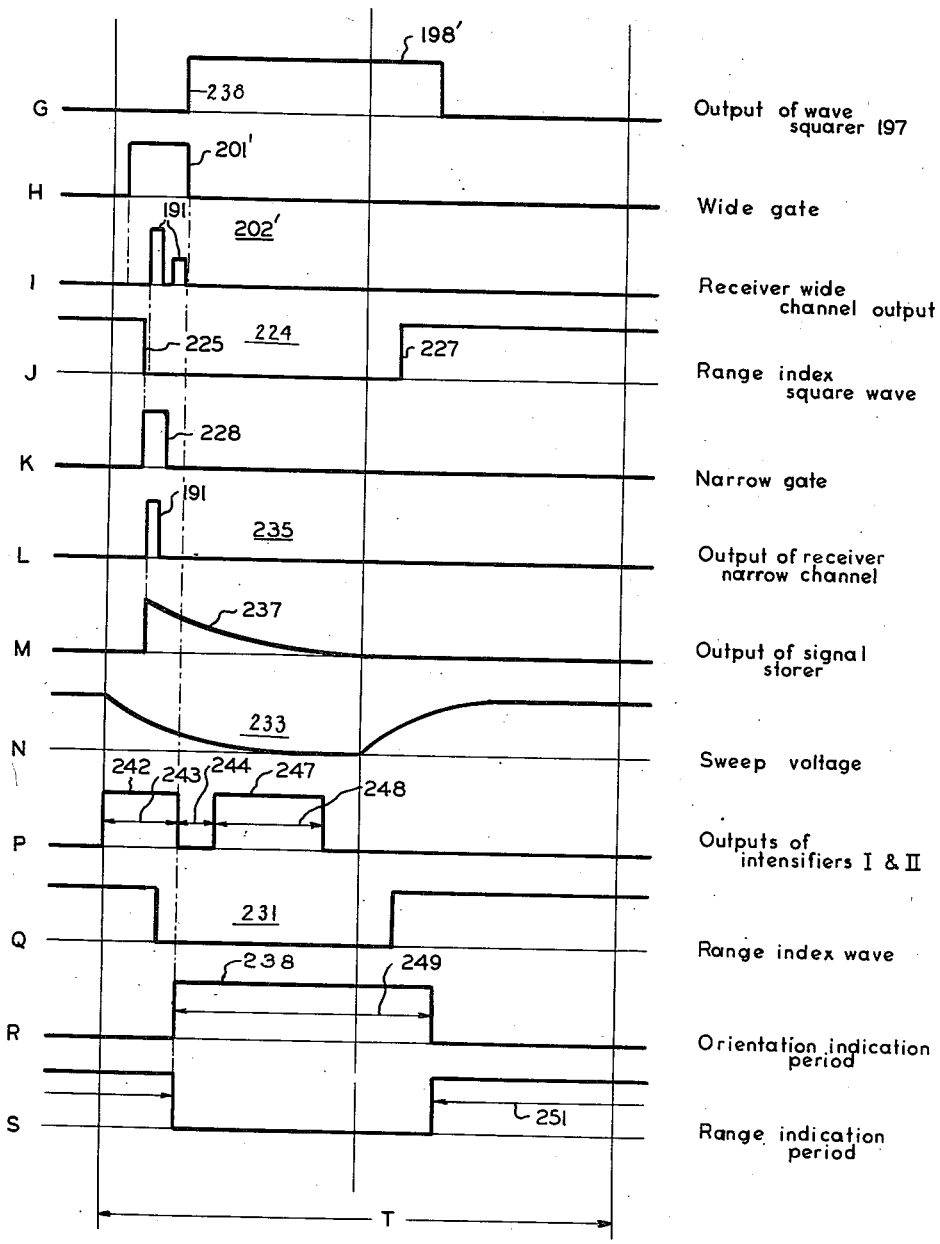
INVENTORS,
C. G. HOLSCHUH, G. E. WHITE,
W. W. MIEHER, & J E SHEPHERD;
BY
Paul B. Hunter
THEIR ATTORNEY.

Patented Nov. 11, 1952

2,617,982

UNITED STATES PATENT OFFICE 2,617,982

RADIO GUN CONTROL SYSTEM

Carl G. Holschuh, Glen Head, Gifford E. White, Hempstead, Walter W. Mieher, Mineola, and James E. Shepherd, Hempstead, N. Y., assignors to The Sperry Corporation, a corporation of Delaware Application April 30, 1942, Serial No. 441,188

63 Claims. (Cl. 343—7)

The present invention is concerned with radio-directed fire control systems especially adapted for use in aircraft and against other fast moving aircraft.

For the protection of large aircraft, such as heavy bombers, it is known to use flexible gun turrets movable independently of the craft in association with a computing gun sight or computer which is manually tracked with the target and thereby derives the proper gun aiming data for controlling the gun turrets. Up to the present time, however, such inter-aircraft fire control devices, and also anti-aircraft fire control devices, have relied upon visual tracking of the target for determining the correct gun aiming angles. Such prior art systems are subject to the well known limitations of visual sighting, such as reliance upon proper weather and visibility conditions, upon sufficient lighting, and upon the restricted range of optical telescopes. Even under optimum conditions of visibility, the visual detection of the approach of aircraft and visual tracking with aircraft have been difficult and uncertain. For instance, aircraft approaching from the direction of the sun can be seen only with the greatest difficulty. Furthermore, the observer cannot scan the whole zone of danger quickly and carefully with certainty by the eye alone.

In order to overcome these and other disadvantages of the prior systems, the present invention provides a system in which the target is detected, located, and tracked by a radio beam which effectively replaces the visual line of sight of prior systems. However, before describing the present system, certain essential requirements for such a system will be discussed.

Firstly, the defending aircraft must be apprised of the presence and approximate direction or orientation of all targets in its vicinity in order to be able to effectively plan and accomplish its defense. In addition, it is desirable that the approximate range of each of these various targets should be indicated simultaneously with its location, for similar reasons. After having been warned of the presence, orientation, and range of these targets, and after having chosen one or more of them as of greater importance for immediate engagement, it is necessary for the particular target selected to be tracked by the fire control system in order to determine the target present position, such as defined by is elevation, azimuth, and range, in the present case, and to determine the rate of change of position, as defined by target elevation rate and azimuth rate, in order that the correct gun aiming angles for controlling the guns and turrets may be derived by the computer.

In order to relieve the fire control officer of as much of the burden of tracking as is reasonably possible, it is desirable to automatically track with the target, at least in elevation and azimuth, and possibly also in range, so as to automatically set into the computer mechanism the proper target position and target rate data.

The present system offers an improved type of warning or searching system in combination with several types of tracking or fire control systems. Preferably, since space and weight are at a premium in aircraft, these various systems are combined as much as possible to use a minimum amount of equipment.

Accordingly, by the present system there is provided apparatus for indicating the presence, approximate orientation, and approximate range of all targets within a predetermined portion of space, such as a hemisphere, which apparatus may be converted upon selection of a particular target into any one of three different types of tracking systems: (1) a system in which the fire control officer actuates the computer setting in such a manner as to maintain a radio line of sight in track with a target, (2) a system in which a radio line of sight is automatically tracked with a target and the fire control officer actuates a computer to maintain it in synchronism with the radio line of sight, and (3) a fully automatic system in which a radio line of sight is automatically maintained in synchronism with the target and serves to automatically set into the computer the proper target data required by the computer.

By such a system both the warning and tracking may be performed entirely independently of any optical visibility conditions and at a much greater range than was formerly possible, without impairing in any way any of the desirable features of former types of fire control systems.

In addition, the operation of the present system is made to agree in substantially all operations to be performed with the operation of prior systems and the natural instinctive reactions of the operator are utilized by the provision of controlling operations which are naturally dictated by the circumstances encountered.

Accordingly, it is an object of the present invention to provide improved gun control systems independent of visual devices.

It is another object of the present invention for providing improved radio-operated gun control systems.

It is still another object of the present invention to provide improved radio-directed gun control systems for detecting the presence of a target and for tracking a computing gun sight with the target.

It is still a further object of the present invention to provide improved automatic gun control systems.

It is still another object of the present invention to provide improved object detecting and locating devices.

It is a further object of the present invention to provide improved warning systems adapted to indicate the presence, location and approximate range of distant objects.

It is yet another object of the present invention to provide an improved gun control system adapted to selectively (a) search and locate targets, (b) manually track with targets, (c) semi-automatically track with targets, or (d) fully automatically track with targets.

It is another object of the present invention to provide improved devices for indicating the relative displacement between the orientation of a distant object and a predetermined axis such as a radio line of sight.

It is a further object of the present invention to provide improved devices for setting a member, such as a range control member of a computer, in accordance with the distance or range to a distant object.

It is still a further object to provide improved apparatus for automatically maintaining a predetermined axis oriented toward a fast moving target.

Other objects and advantages of the present invention will become apparent from the following specification and drawings, in which, Fig. 1 shows a black or flow diagram of the system of the invention during searching operations.

Fig. 2 shows a corresponding block diagram of the system during manual tracking operations.

Fig. 3 shows a corresponding block diagram of the system during manual automatic operations.

Fig. 4 shows a block diagram of the system during full automatic operations.

Fig. 5 shows a schematic perspective view of one form of scanner useful in the present system.

Fig. 6 shows the radiation pattern of the directive antenna array used with the scanner of Fig. 5.

Fig. 7 shows a longitudinal cross-sectional view of the radiation pattern of the scanner of Fig. 5 during any of the tracking operations.

Fig. 7A is a cross-section of Fig. 7 taken along lines 7A—7A thereof.

Fig. 8 shows a schematic block wiring diagram of one form of radio transmitting, receiving and indicator circuit for searching operations.

Fig. 8A shows a representative view of the cathode ray screen of the indicator of Fig. 8.

Fig. 9 shows a schematic circuit diagram of the spiral sweep or reference voltage generating apparatus for the circuit of Fig. 8.

Figs. 10A, 10B, 10C, and 10D are voltage-time graphs useful in explaining the operation of the circuit of Fig. 9.

Fig. 11 shows a modification of a portion of the circuit of Fig. 9 to the right of line A—A thereof.

Fig. 12 shows a further modification of the spiral sweep or reference voltage generating apparatus of Fig. 9.

Fig. 13 shows a modification of the circuit of Fig. 8, including simultaneous range indicating means.

Fig. 13A shows a representative view of the cathode ray screen of the indicator of Fig. 13.

Fig. 14 shows voltage-time graphs of various portions of the circuit of Fig. 13.

Fig. 15 shows a modification of the portion of the circuit of Fig. 13 within dotted enclosure B.

Fig. 16 shows corresponding voltage-time graphs referring to the circuit of Fig. 15.

Fig. 17 shows a block circuit diagram of one form of apparatus for controlling the scanner orientation from the computer setting, as during searching or manual tracking operations.

Fig. 18 shows a block circuit diagram of one form of range indicating system.

Fig. 18A shows a representative indication produced by the system of Fig. 18.

Fig. 19 shows a modification of the range indicating system of Fig. 18.

Figs. 19A and 19B show alternative types of indication produced by the system of Fig. 19.

Fig. 20 shows a block circuit diagram of one form of indicator useful during tracking operations.

Fig. 20A shows a representative indication produced by the circuit of Fig. 20.

Fig. 21 shows a modification of the indicating system of Fig. 20.

Fig. 21A shows a representative indication produced by the circuit of Fig. 21.

Fig. 22 shows a modification of the portion of the circuit of Fig. 21 to the right of line C—C thereof.

Fig. 23 shows another modification of the circuits of Figs. 20, 21, and 22.

Fig. 23A shows a representative indication produced by the circuit of Fig. 23.

Fig. 24 shows a block circuit diagram of a further indicating system useful during tracking and incorporating several of the features of Figs. 20 to 23.

Fig. 24A shows a representative indication produced by the circuit of Fig. 24.

Figure 25:
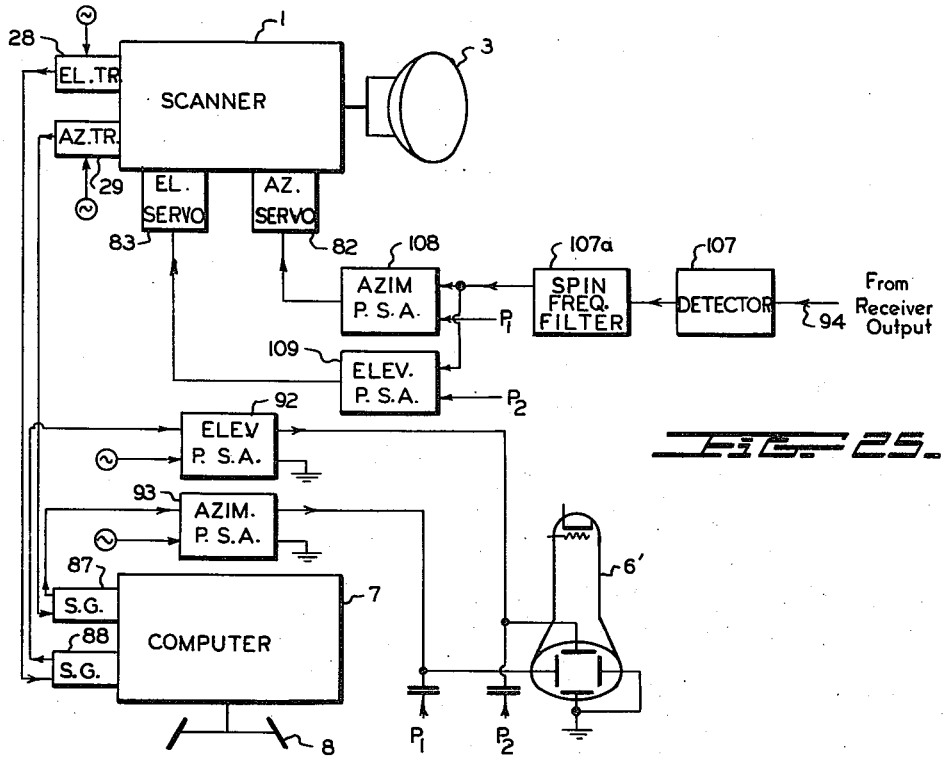

Fig. 25 shows a schematic block diagram of the scanner control and indicator for semi-automatic operations.

Figure 26:
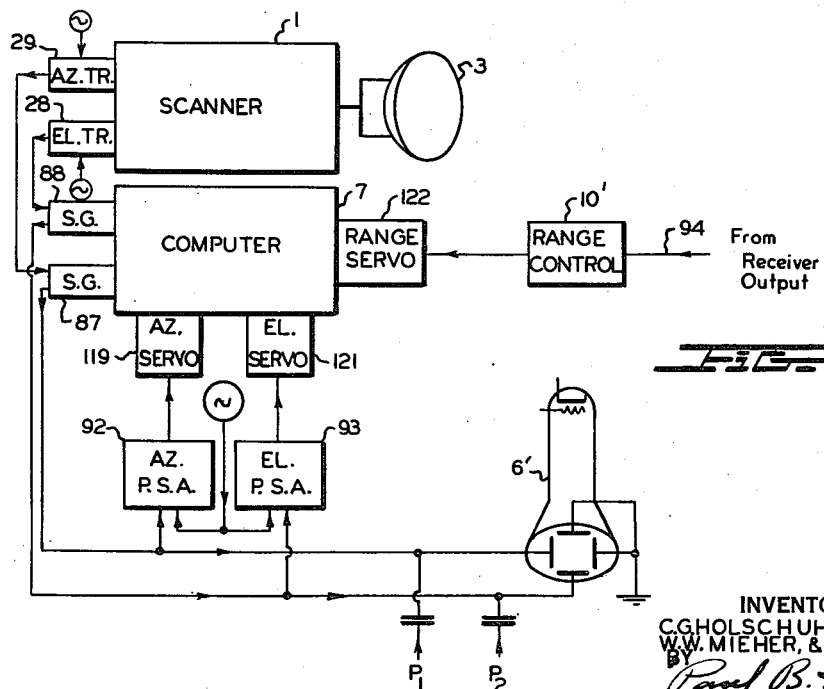

Fig. 26 shows a schematic block diagram of the computer setting control for full automatic operations.

Fig. 27 shows a block circuit diagram of an indicator system combining range and orientation indications upon a common indicator and useful for searching or any form of tracking.

Fig. 28 shows a schematic block diagram of a scanner and computer control adapted for any one of the four types of operation.

Fig. 29 shows a schematic perspective view of a manual control unit suitable for use in Fig. 28.

Fig. 30 shows a radio and indicator block circuit diagram adapted for selectively producing any one of the four types of operation.

Fig. 31 shows voltage-time curves of various parts of the circuit of Figs. 29 and 30 during searching operations.

Fig. 32 shows corresponding voltage-time curves during tracking operations.

As discussed above, the present system is adapted for two major types of operation, namely, (1) a searching operation for roughly indicating the position and/or distance of any targets within the field of operations of the device and (2) a tracking operation in which a particular target may be selected and followed by the device for properly directing a gun thereat. Three alternative types of tracking operation, known as "manual," "semi-automatic," and "full automatic" tracking may be used.

For describing generally these various types of operation, recourse is had to Figs. 1–4, more specific details of the system being described with respect to later figures.

Fig. 1 shows a block or flow diagram of the present system when operating during searching. In this system, a scanner 1 projects a sharply directive beam of radiant energy, such as 19 in Fig. 6, obtained as from a suitable transmitter 2 and directive antenna arrangement 3. This beam comprises a periodic sequence of short duration pulses of high frequency energy, and during searching is swept in a spiral cone over a predetermined solid angle, which is preferably substantially a hemisphere, in such manner that the radiant energy is projected at some time during its cycle into every part of the solid angle. Should any object or target be located in this solid angle, the projected radiant energy will be reflected therefrom when the beam is directed thereat, and will be received in the same antenna system 3, which acts dually as a transmitting and a receiving system.

This reflected series of pulses of high frequency energy is received in a radio receiver 4 whose output actuates a suitable indicator 6. This indicator, as will be described below more in detail, is preferably a cathode ray tube whose electron beam trace is caused to sweep in spirals in synchronism with and instantaneous correspondence with the spiral scanning motion of the scanner. For this purpose the indicator 6 is also controlled from scanner 1. The received reflected pulse is caused to momentarily brighten the trace of the beam and thereby produce on the cathode ray screen an indication of the existence and approximate orientation of the reflecting object. The approximate range of the reflecting object may also be shown, as described below with respect to Figs. 13–16.

The orientation of the scanner 1, which may be taken to be the orientation of the polar axis of the spiral conical scanning motion, is placed under the control of a computer 7, whose elevation and azimuth settings may be manually actuated from a suitable manual control 8. Computer 7 is adapted to calculate the proper gun aiming angles for intercepting the target by a projectile when the computer is set in accordance with the present target position data, such as elevation, azimuth and range of the target, and in accordance with the rate of change of the present target position, such as elevation rate and azimuth rate. A suitable form for such a computer is shown more in detail in copending application Serial No. 411,186, for Inter-aircraft Gun Sight and Computer, filed December 17, 1941, in the names of C. G. Holschuh and D. Fram, now abandoned. As is shown in this copending application, the range setting of computer 7 may be performed by a suitable foot pedal 10. The orientation control is effected by a handle bar control 8 whose displacement about two independent axes represents a combination of the displacement and rate of change of displacement of azimuth and elevation settings of computer 7, providing aided tracking. In operation, the controlling officer actuates control 8 so as to maintain the present target position setting of the computer 7 in track with the target, as evidenced (in the prior application) by a suitable optical sighting arrangement. By so doing, the proper target elevation, target azimuth, target elevation rate and target azimuth rate are set into the computing mechanism 7 together with the range data set in by foot pedal 10, whereby computer 7 may determine the gun aiming angles. In the present system, the same operations are performed, but utilizing a different type of indicator to show the proper tracking conditions, as will be described.

The scanner 1 is suitably controlled, as will be seen hereinafter, in accordance with the target elevation and target azimuth setting of computer 7. The gun aiming angles determined by computer 7 are used to suitably control the orientation of one or more guns or turrets 9, which are thereby rendered effective against the target.

A suitable type of gun control apparatus for orienting the guns 9 under the control of the computer 7 is shown in copending application Serial No. 424,612, for Hydraulic Remote Operating Systems, filed December 27, 1941, in the names of E. L. Dawson, F. M. Watkins and C. N. Schuh, Jr., which issued on July 27, 1948 as U. S. Patent No. 2,445,765. It is to be noted that the present system is not confined to the use of this particular type of gun control apparatus, but that any other suitable type of remote control system may also be used. If desired, the guns 9 need not be directly controlled from computer 7 but may be locally controlled in accordance with suitable indications transmitted from computer 7 in any well known manner.

The system as shown in Fig. 1 is not intended for use as the actual gun control system but is merely intended to search out possible targets and to enable the scanner to properly locate a target for the purpose of later tracking with it. For this reason, the control from computer 7 to guns 9 is shown dotted in Fig. 1. After a target is observed on the screen of cathode ray indicator 6, the manual control 8 of computer 7 is actuated to adjust the orientation of scanner 1 to the position where this orientation coincides as closely as possible with the orientation of the desired target, as evidenced by the position of the bright spot indication on the indicator screen. When this adjustment has been made, the system is ready to change-over to the tracking operation.

The present system is adapted to use three separate and distinct types of tracking, any one of which may be selected at the option of the fire control officer. It is to be noted that each of these types of tracking system may be used independently of the others if desirable. For all of these types of tracking operation, scanner 1 is energized from transmitter 2 by the same type of periodic pulse wave as described with respect to the searching operation. However, scanner 1 no longer performs spiral scanning as in Fig. 1 but instead it is converted to perform a narrow circular conical scanning with a very small apex angle. Preferably, this angle is of the order of the angular width of the radiation and reception pattern derived from antenna 3, indicated in Figs. 6, 7 and 7A.

Thus, if antenna system 3 is adapted to produce a beam of radiant energy having a directive radiation pattern such as 19 in Fig. 6 with a directivity axis 21 then, during tracking, beam 19 will be rotated by scanner 1 about an axis such as 23 in Fig. 7, whereby directivity axis 21 performs a conical motion about axis 23, which may be termed the tracking directivity axis since it is this axis which defines the radio line of sight, as will be seen. Preferably, radiation pattern 19 is made to have a small apex angle such as of the order of 4° in angular width between the half-power points. Then, during tracking, the cone described by axis 21 would preferably have an apex angle also of the order of 4°. In this manner, the useful portion of the radiant energy would be projected over a conical solid angle having an 8° apex angle. Energy reflected from an object or target within the field of this radiant energy will be received by antenna arrangement 3 and led thereby to receiver 4 whose output actuates the tracking indicator 6' to indicate the relative displacement between the scanner orientation defined by axis 23 and the orientation of the target.

In the system of Fig. 2, manual actuation of computer control 8 serves to set azimuth and elevation data into computer 7 and at the same time controls the orientation of scanner 1, as determined by axis 23, to assume the same azimuth and elevation as is set into computer 7, in the same manner as described with respect to Fig. 1. In effect, the orientation of scanner 1 is made the same as the orientation of computer 7, the latter term meaning the orientation corresponding to the azimuth and elevation data set into the computer mechanism.

Also actuated from receiver 4 is a range indicator 6''. A matching index is provided for indicator 6'', as will be described more in detail below, which is placed under the control of range pedal 10 serving also to set range data into computer 7.

In operating the system of Fig. 2, the operator will, by his manual control 8, orient scanner 1 until the tracking indicator 6' shows that the target orientation coincides with the scanner orientation. At the same time, the operator actuates the range foot pedal 10 to match the range index to the indication produced by range indicator 6''. When these conditions obtain, and are maintained even during the motion of the target, the operator will know that the proper data is set into computer 7 and that the guns 9 controlled from the computed output of computer 7 are directed at the correct aiming angles to intercept the target with a projectile, and he may therefore, by a suitable firing key or control, fire at the target.

This system is known as "manual tracking" since the operator, through his manual control 8 and foot pedal 10, directly actuates the scanner and computer 7 to track with the target as evidenced by indicators 6' and 6''. The scanner 1, in effect, operates to produce a radio line of sight in the same way as the sighting telescope in a conventional anti-aircraft or inter-aircraft system operates to produce an optical line of sight, to enable the computer 7 to track with the present position of the target, whereby the proper gun aiming angles are determined.

A second type of tracking operation is illustrated in Fig. 3 and is termed "semi-automatic tracking." In this case the scanner 1, again performing circular conical scanning as described with respect to Fig. 2, is caused to automatically align its orientation with that of the target. This is done by using the reflected pulses received from the target to actuate suitable servomotors for orienting the scanner, which is thereby automatically oriented toward and tracks with the target. The computer 7 is again manually controlled from controls 8, in this instance to follow and track with the orientation of scanner 1. Thus, tracking indicator 6' in this type of system serves to indicate the displacement between the orientation of scanner 1 and computer 7, and computer 7 is actuated to maintain this "computer error" at zero. When this condition obtains, and with the proper computer range adjustment, similar to that described in Fig. 2, the output of computer 7, controlling guns 9, again represents the proper gun aiming angles and effective fire may be obtained from the guns.

Fig. 4 shows the third or "full automatic" tracking system in which no manual actuation is necessary. Here, scanner 1 is automatically oriented toward the target, under the control of the output of receiver 4, as in Fig. 3, and, in addition, the "orientation" of computer 7 is caused to automatically follow the position of scanner 1 by a suitable servo mechanism. In this manner, the proper target azimuth and elevation data are set into the computer 7. The range adjustment of computer 7 is also automatically performed by a range control 10' under the control of receiver 4. This system, however, does not obtain the target rates, that is, elevation rate and azimuth rate, in the same manner as in Figs. 2 and 3.

In the system of Fig. 4, it is necessary to determine elevation rate and azimuth rate by actually measuring the angular rate of motion of the azimuth and elevation input controls of scanner 1. This may be done in any well known way, such as is shown and described in U. S. Patent No. 2,206,875, for Fire Control Device issued July 9, 1940 in the name of E. W. Chafee et al. In this manner, all the required data may be set into computer 7 and therefore the guns 9 are automatically oriented at the proper gun aiming angles and automatically follow the target with, of course, the computed lead angles.

Indicator 6' in this instance merely serves as a monitor indicator to show how well the scanner 1 is following the target or, alternatively, how well the computer 7 is following and tracking with scanner 1. Indicator 6'' serves similarly as a range monitor indicator.

The present system is therefore capable of four alternative modes of operation, namely, searching, manual tracking, semi-automatic tracking, and full automatic tracking.

Fig. 5 shows a schematic representation of one suitable type of scanner 1. Thus, the scanner 1 may comprise a directive antenna system 3, shown as comprising a parabolic wave guide reflector, and energized through suitable electromagnetic wave guide connections 11 from transmitter 2. A suitable construction for scanner 1 is shown and described in copending application Serial No. 438,388, for Scanning Devices, filed April 10, 1942 in the names of L. A. Maybarduk, W. W. Mieher, S. J. Zand and G. E. White, which issued on November 12, 1946 as U. S. Patent No. 2,410,831. As therein disclosed, the antenna arrangement 3 in one form may be continuously "nodded" or oscillated at a slow rate about nod axis 12 which is itself rapidly and continuously rotated or "spun" about spin axis 13 thereby producing a spiral conical scanning pattern by the continuous widening of the conical sweeping about spin axis 13. To convert from the spiral searching scanning to the circular tracking scanning, the nod motion about the nod axis 12 is interrupted, with the orientation of the directive radiation or receptivity pattern axis 21 displaced slightly from the spin axis 13.

In order to feed radiant energy from wave guide 11 to the radiator 3, suitable stationary joints 14 and rotating joints 16 are provided as described more in detail in the above-mentioned copending application Serial No. 438,388, and in copending application Serial No. 447,524 for high frequency apparatus, filed June 18, 1942 in the names of W. W. Mieher and J. Mallet, which issued on September 10, 1946, as U. S. Patent No. 2,407,318.

To provide the necessary control of tracking indicator 6' from scanner 1, in the manner to be described, suitable self-synchronous position transmitters are provided for producing signals indicative of the instantaneous position of the radiator 3 in nod and in spin, that is, indicative of the orientation of axis 21. The nod transmitter is indicated schematically at 17, the spin transmitter at 18. These transmitters may be of the well known "Selsyn," "Autosyn," or "Telegon" types.

Referring to Fig. 6, there is shown the radiation or receptivity pattern 19, of the antenna array 3 of Fig. 5. It will be noted that this radiation pattern 19 preferably is axially symmetrical about axis 21, and is substantially contained within a narrow solid cone 22, thereby forming a sharply directive beam of transmitted energy or a sharply directive reception pattern. Pattern 19 has been exaggerated for purposes of illustration, and preferably is very narrow, such as about 4° between the half-power points. During searching operations the axis 21 of this beam 19, by virtue of the combined effect of the nodding and spinning action of scanner 1, is caused to sweep out a spiral cone in space, the solid angle of this sweep being suitably chosen and ranging up to a complete hemisphere as desired. Preferably, the angular pitch of this spiral is chosen to be of the order of the effective angular width of the beam 19 whereby, during one complete spiral scan every portion of the conical solid angle will have had radiant energy projected to it, and radiant energy may be received from every such portion. The rates of nod and spin of the scanner of Fig. 5 are suitably chosen to provide a sufficiently short time interval for a complete scan, suitable for the purposes at hand.

During tracking operations the nod motion of scanner 1 is stopped at a position so that the axis 21 of maximum radiation or receptivity is displaced slightly from the spin axis 13 about which the radiation pattern 19 is rotated. In this way, as shown in Figs. 7 and 7A, energy of constant intensity is radiated or received along an axis 23 coincident with spin axis 13. However, along some other axis, such as 24, for example, maximum radiation and maximum receptivity is encountered only once during each spin cycle, resulting in a spin frequency modulation of waves received by reflection from an object orientated along axis 24.

The use of the same antenna arrangement for transmitting and receiving increases the sharpness of the resulting determinations since the over-all response pattern is the product of the radiation and receptivity patterns. If desired, however, a non-directional transmitter or receiver could be used with the described scanner acting respectively as a receiver or transmitter.

Conversion from searching to tracking scanning is effected, as described in application Serial No. 438,388, merely by energization of a suitable control solenoid. Other types of scanners are also described therein, requiring different apparatus for converting from searching to tracking, but all adapted to be used for searching or tracking in the same manner as the scanner of Fig. 5.

It may also be desirable to adjust the axis of this spiral scanning during the searching operation. For this purpose, scanner 1 may be provided with an elevation axis 26 and an azimuth axis 27 about which it may be suitably adjusted, in the manner described in application Serial No. 438,388, the control action being as described below. Also, suitable elevation and azimuth position transmitters 28 and 29 may be used, as will also be described below.

Fig. 8 shows one form of radio and indicator system for giving suitable indications during searching. Thus, assuming that the scanner of Fig. 5 is performing the spiral scanning described above, antenna array 3 is fed with radiant energy as over wave guide 11, from a transmitter and modulator unit 31. This transmitter 31 is adapted to produce high frequency radiant energy in any well known manner, and to modulate this high frequency energy by means of periodically recurring short duration pulses such as may be derived from a conventional control oscillator and pulse generator 32. There is thus radiated from the radiating arrangement 3 a sequence of short pulses of high frequency radiant energy. The frequency of control oscillator 32 and thereby the repetition frequency of the radiated pulses is chosen to have a suitably high value such that a substantial number of pulses is sent out during each spin rotation of the scanner 1 of Fig. 5. Suitable values for various constants of the circuits during this form of operation have been found to be the following: spin rotation, 1200 revolutions per minute; nod oscillation, 30 complete oscillations per minute; pulse repetition frequency, 2000 per second. With these values it will be seen that one complete cycle of spiral scanning will be accomplished each two seconds, one second being taken up in a spiral scan from zero nod to full nod, the other second of the cycle comprising the time for spiral scanning from full nod back to zero nod. During each half of the complete cycle 20 complete spin rotations are performed. Thus, for a full hemisphere of scan, the angular advance for each spin cycle will be approximately 4½ degrees, which is of the order of magnitude of the width of the radiation pattern 19 shown in Fig. 6. The pulse repetition rate of 2000 pulses per second gives 100 pulses per spin rotation, which thereby produces one pulse for each 3.6 degrees of motion of the radiation pattern 19 during scanning. Since the radiation pattern 19 is approximately 4 to 5 degrees wide, it will be seen that at least one pulse of radiant energy is transmitted to each point of the hemisphere.

Should a distant object be in the field of the system during radiation, at least one pulse will be incident thereon, and reflected therefrom. This reflected pulse or pulses will be picked up in the antenna arrangement 3 and conducted through wave guide 11 to the receiver unit 4 through a T-R box 33. T-R box 33 is adapted to pass the relatively low intensity received pulses but to block out the relatively high intensity transmitted pulses derived from transmitter 31. A suitable form for such a T-R box 33 is shown in copending application Serial No. 406,494 for Radio Apparatus for the Detection and Location of Objects, filed August 12, 1941 in the names of J. Lyman et al., and comprises, as is therein shown, an ionizable medium containing a spark gap within a resonant cavity which is resonant to the high frequency of transmission. The spark gap is so adjusted that the low intensity received waves are insufficient to create a discharge across the gap, whereas the high intensity transmitted pulses are sufficient to create such a discharge, which thereby ionizes the ionizable medium and effectively short circuits the wave guide 11 to these transmitted waves. In this manner the receiver unit 4 is effectively isolated from the high intensity transmitted pulses while being free to receive the pulses reflected from a distant object. Receiver unit 4 includes conventional pre-amplifying, detecting and wide-band amplifying units, all well known in the art, and is adapted to produce, in its output, signal currents or voltages corresponding to the wave shape of the envelope of the received reflected wave.

Referring to Fig. 14, the wave envelope of the radiated waves may be as shown at 34. The output of receiver unit 4 (see Fig. 13) may then have the wave shape shown at 36. As there shown, a plurality of reflected pulses, 36a, 36b, etc., have been received corresponding to a plurality of reflecting objects located along the particular orientation of the radiation and reception pattern at the instant under consideration. These pulses are applied to the control grid 37 of the cathode ray tube indicator 6 shown in Fig. 8. Grid 37 is provided with a suitable bias, as by way of lead 38, such that, with no output from receiver 4, the cathode ray beam, produced by the usual means, is prevented from reaching the screen of the cathode ray tube indicator 6. However, this bias is also so adjusted that the received pulses 36 derived from the receiver unit 4 are permitted to momentarily render the electron beam trace visible on the screen of indicator 6. Thus, it will be clear that each time a reflected pulse is received a momentary bright spot occurs on the cathode ray screen.

In order to give an indication of the orientation of the reflected object with respect to the location of the system of the invention it is desirable to produce a spiral scanning of the electron beam in synchronism with and corresponding instantaneously to the spiral scanning of the radiation and reception pattern 19. Suitable devices for obtaining deflecting voltages which will produce such a spiral scanning are shown in Figs. 9 through 12. Assuming, for the moment, that such spiral sweep voltages, designated as $P_1$ and $P_2$, have been obtained, these voltages $P_1$ and $P_2$, to be hereafter described more in detail, are impressed upon respective pairs of deflecting plates of the cathode ray indicator 6 and produce a spiral scanning of the electron beam such that at each instant the orientation of the latent trace of the beam on the screen of the cathode ray indicator 6 with respect to the screen center or pole 39 of Fig. 8A, corresponds to the instantaneous orientation of the beam axis 21 of antenna array 3 of scanner 1. Under these conditions the momentary brightening or intensifying of the electron beam under the control of receiver 4 will produce a momentary bright spot such as 41 shown in Fig. 8A. If a plurality of objects having different orientations are within the effective field of the searching system further bright spots such as 42 and 43 will also be produced, each having an orientation with respect to pole 39 respectively corresponding to the orientation of the corresponding reflecting object with respect to the spin axis 13 of the scanner 1.

As described above, the transmitted pulses and hence the reflected pulses are of quite short duration, such as the order of 1 microsecond. In order that the bright spots 41, 42 and 43 may be more clearly shown it is desirable to let the beam impinge upon the screen for a longer interval. For this purpose a signal storer 44 is inserted between receiver 4 and intensity control grid 37. This signal storer 44 may simply comprise a condenser-resistor network adapted to be instantaneously charged by a pulse derived from receiver 4 and which will maintain its charge beyond the duration of the pulse. However, the time constant of the signal storer 44 is preferably so chosen that this accumulated charge will be fully dissipated within a time not much longer than one recurrence period of the transmitted pulses in order that erroneous indications shall not be obtained. In this way the traces 41, 42, 43 are made brighter. In addition, the screen of indicator 6 is preferably made of high retentivity, so as to maintain its indication for a substantial interval after excitation is removed.

Fig. 9 shows one form of circuit for producing the spiral sweep voltages used with indicator 6 of Fig. 8. In this figure, nod transmitter 17 is indicated as being of a two-phase type having a single-phase energizing winding 46 and a two-phase secondary winding 47, in this instance connected in series to provide a single output. Winding 46 is energized from a suitable source 48 of alternating current. The output voltage appearing across the polyphase winding 47, namely voltage $V_1$ having wave shape as shown in Fig. 10A, will therefore be an alternating voltage having the frequency of source 48 and an amplitude varying in correspondence with the amount of nod, referred to the orientation of the scanner spin axis as zero nod. This wave is shown in Fig. 10A, being illustrated as having a linear change of amplitude with nod. It is to be noted that ordinarily this change of amplitude will be sinusoidal in character. However, by the use of proper motion converting devices whereby full nod motion corresponds to a small angular displacement of winding 46 with respect to winding 47, it may be made linear as illustrated. Preferably full nod is made to correspond to less than 45° rotation of transmitter 17, resulting thereby in substantially linear output as shown in Fig. 10A.

During searching operations, switch 49 will be connected to terminal S and hence the output voltage $V_1$ of nod transmitter 17 is fed to the single-phase winding 51 of the spin transmitter 18. The output from each of the two-phase windings 52 and 53 of spin transmitter 18 will then be the wave of Fig. 10A sinusoidally modulated in amplitude at the frequency of spin. This is shown in Fig. 10B for the winding 52. The winding 53, being displaced 90° in space with respect to winding 52, will have induced in it a voltage of similar wave shape but displaced 90° in phase at the spin frequency. In effect, spin transmitter 18 serves as a two-phase generator of spin frequency whose output amplitude is controlled by nod transmitter 17.

To each of these voltage outputs windings 52 and 53 there is added a voltage of the frequency of source 48, as by way of transformer 54, producing the wave shown in Fig. 10C. It is to be noted that the wave of Fig. 10B represents in effect a suppressed-carrier modulated wave. The reinsertion of the carrier as by transformer 54 produces the usual modulated carrier wave shown in Fig. 10C. The resulting two waves are then rectified or detected in respective rectifiers 56 and 57 and filtered in filters 58 and 59 to produce the output voltages appearing on output leads 61 and 62 having the wave shape shown in Fig. 10D, namely, phase-displaced voltages of spin frequency modulated by the nod wave envelope.

These two voltages appearing on lines 61 and 62 will be phase displaced by 90° of the spin frequency. They will be termed the spiral sweep voltages $P_1$ and $P_2$, respectively. As is well known, if two voltages of equal amplitude and frequency, phase displaced by 90°, are impressed on the respective pairs of deflecting plates of a cathode ray tube, the resulting trace of the electron beam will be circular. By simultaneously varying the amplitudes of the two voltages the diameter of the circle will be varied.

In the present instance, by using the two waves $P_1$ and $P_2$ as the deflecting voltages, the beam will be caused to produce a circular pattern of constantly changing diameter and will thereby produce a spiral pattern similar to the pattern swept out in space by the scanner 1. It will, therefore, be clear that these voltages $P_1$ and $P_2$ are particularly suited for use in indicator 6.

During any of the three types of tracking, nod transmitter 17 is disconnected from spin transmitter 18 by switch 49, which then connects winding 51 of spin transmitter 18 to a fixed source of alternating voltage, such as source 48, as by way of lead 50. In this case, output sweep voltages $P_1$ and $P_2$ will have constant amplitude, producing a circular trace on indicator 6, and accordingly will be termed "circular sweep voltages."

Fig. 11 shows an alternative circuit for inserting the carrier and demodulating the waves produced by spin transmitter 18 to produce the sweep voltages $P_1$ and $P_2$. Thus, here the respective outputs of windings 52 and 53 are impressed upon the grids of respective detector or demodulator tubes 63 and 64 whose plate circuits are energized simultaneously from alternating voltage source 48. By properly phasing the anode voltage with respect to the grid voltages, and by filtering out all carrier frequency components, as in filters 58 and 59, the same type of spiral sweep voltages $P_1$ and $P_2$ will be obtained as in Fig. 9.

Fig. 12 shows a further modification of the spiral sweep voltage generating circuits of Figs. 9 and 11, particularly adapted for using conventional "autosyn" or "selsyn" devices. Thus, the nod transmitter 17' comprising, as is well known, a three-phase type winding 47' and a single-phase winding 46' relatively rotatable with respect to one another, has two of its polyphase field windings energized in series from the source 48 of alternating voltage the third winding remaining unenergized. In effect, therefore, there is produced in the single-phase winding 46' a varying alternating voltage similar to the voltage $V_1$ shown in Fig. 10A. It will be apparent that nod transmitter 17 of Fig. 9 and transmitter 17' of Fig. 12 are completely interchangeable, since, as used, they produce the same voltage output. This voltage derived in winding 46' is fed to the single-phase winding 51' of the "selsyn" type spin transmitter. There is thereby produced in the polyphase windings 52', 53', 18' and 55' three voltages of the character shown in Fig. 10B, relatively displaced 120° with respect to one another and thereby forming a three-phase spiral sweep voltage. This three-phase voltage is converted into a two-phase voltage in a conventional "Scott T" transformer 66, which is well known in the art. The two-phase voltage output of transformer 66 is combined with a carrier voltage derived from source 48 by way of transformer 54, identical to that in Fig. 9 and the resulting voltages are each demodulated in respective demodulators 67 and 68 of any well known type, to produce the required sweep voltages $P_1$ and $P_2$ as before.

Here again means are provided for converting voltages $P_1$ and $P_2$ from spiral sweep voltages to circular sweep voltages. This means comprises switch 65 which connects winding 51' of spin transmitter 18' to nod transmitter 17' during searching, and to a fixed source 48 during tracking.

Fig. 13 shows a modification of the searching indicating circuit of Fig. 8, including a rough range indication. As in Fig. 8, control oscillator and pulse generator 32 controls transmitter and modulator unit 31 to produce periodic pulses of high frequency energy, which are then radiated from the scanner 1 of Fig. 5, performing spiral scanning as before. The wave envelope of the energy radiated may be as shown by curve 34 in Fig. 14.

Should any objects be present in the field of the radiating system, such distant objects would reflect pulses as before and the reflected pulses, having, for example, the wave shape such as at 36 in Fig. 14, would be received by the receiver 4 through the T-R box 33 and would control the intensity grid 37 of the cathode ray indicator as in Fig. 8. A switch 69 may be provided, in whose upper position a signal storer 44 similar to that in Fig. 8 is rendered effective, while in the lower position signal storer 44 is cut out of the circuit, and the pulses 34 directly control the intensity grid 37.

In order to provide a rough range indication, the transmitted pulses obtained from transmitter-modulator 31 are also fed to a suitable rectifier, such as a diode 71, and the rectified pulses thereby obtained serve to excite a resonant circuit comprising a condenser 72 and a suitable inductance 73. The resonant frequency of resonant circuit 72, 73 is made fairly high, such as of the order of three megacycles, and the output of resonant circuit 72, 73, as derived from a coil 74 coupled to inductance 73 is caused to be damped by means of a shunt resistor 76 connected in shunt with condenser 72 and inductance 73, or by the internal resistance of inductance 73.

As a result, the voltage derived in coil 74 will have some such wave shape as shown at 77 in Fig. 14. As there shown, the oscillatory wave 77 is damped so as to have substantially zero amplitude by the time the next transmitted pulse is derived, at which time a new train of highly damped oscillations is initiated. If desired, wave 77 could be even more highly damped to insure its dying out before the next transmitted pulse occurs. This damped oscillatory voltage 77 is connected in series with one of the pairs of deflecting plates of cathode ray tube 6. Both pairs of deflecting plates are also energized in accordance with the spiral sweep voltages $P_1$ and $P_2$ as in Fig. 8.

The result of this additional voltage 77 is to produce, instead of a bright spot such as 41, 42 or 43 of Fig. 8A, a definite line such as 41', 42' and 43' of Fig. 13A. The width of each of these lines depends upon the instantaneous amplitude of the wave 77 at the instant that the beam trace becomes visible, that is, at the instant that the received pulse such as 36a is received. It will be clear that the sooner pulse 36a is received after transmitted pulse 34 is emitted, the greater will be the instantaneous amplitude of wave 77 and therefore the longer will be the line segment indication such as 41'. Since the distance to the reflecting object is directly proportional to the delay time between transmitted and received pulses, it will be clear that the closer the reflecting object is to the transmitter, the longer will be the indication shown in Fig. 13A, and the more distant the reflecting object is the shorter will be the indication. There is thus provided a rough range indication superposed on the object detecting indication of Fig. 8A resulting in the indication represented by Fig. 13A, showing the orientation and rough range of several objects in the scanning field.

The indication of Fig. 13A will be obtained whether or not signal storer 44 is used in Fig. 13. However, it is preferable to insert signal storer 44 in the circuit in order to enhance the brightness and legibility of indication. The effect of signal storer 44 is to leave the electron beam on from the instant of reception of pulse 36a until substantially the next transmitted pulse. When such is the case, it will be clear that the indication will be in effect a bright spot similar to 41 carrying fainter "wings" which form the complete indication shown at 41'. These "wings" are produced by the limits of the oscillating excursions of the beam caused by voltage 77, and their length is inversely proportional to the range of the distant object.

Fig. 15 shows a modification of the portion of the circuit of Fig. 13 contained within dotted enclosure B. As shown in Fig. 15, the output of demodulator 71 is now fed through a condenser 78 shunted by a resistor 79. The time constant of condenser 78 and resistor 79 is so chosen that the voltage accumulated on condenser 78 will persist for a substantial part of the period between consecutive transmitted pulses. This voltage may be as shown at 81 in Fig. 16.

With the modification of Fig. 15, signal storer 44 must be used. Thereupon, when a received pulse, such as 36a is produced, the electron beam causes a bright spot to appear on the screen of the indicator 6, which persists, due to action of signal storer 44. Due to the variation of the voltage 81, this bright spot will move horizontally, in the illustration shown, for a distance determined by the instantaneous amplitude of the voltage 81 at the instant the reflected pulse 36a is received, since the beam will be on all during the decay of voltage 81. The resulting indication will be as in Fig. 13A.

Accordingly, here again the length of the line segment indication will be inversely proportional to the reflection time and, accordingly, will indicate the proximity of the distant object.

It will be clear that in either or both Figs. 13 and 15, the "wing" voltage may be put on the vertical deflecting plates if desired, producing vertical line segment indications.

During spiral scanning and searching it is desirable to be able to adjust the orientation of the spin axis 13 of the scanner and, hence, to change the space orientation corresponding to the pole 39 of the indication shown in Figs. 8A or 13A. For this purpose, referring now to Figs. 17 and 5, scanner 1 is provided with azimuth and elevation servo devices, such as 82 and 83, respectively, adapted to actuate the scanner 1 about azimuth axis 27 and elevation axis 26, as shown in Fig. 5. These servo devices may be of any well known type adapted to position their outputs in accordance with suitable input voltages. Their details form no part of the present invention.

Also coupled to azimuth axis 27 is azimuth self-synchronous transmitter 29 of any conventional type, and correspondingly coupled to elevation axis 26 is elevation transmitter 28. As is well known, these transmitters 29 and 28 are provided with alternating voltage of a suitable frequency, such as from source 48, and their respective outputs 84 and 86 correspond to the instantaneous orientation of spin axis 13 in azimuth and elevation.

Computer 7 is also provided with similar self-synchronous devices 87 and 88 actuated respectively by the elevation and azimuth input settings of computer 7. These devices are connected to the outputs 84 and 86 of scanner transmitters 29 and 28 and serve as synchronous transformers or signal generators, as is well known, to produce in their outputs 89 and 91 alternating signal voltages corresponding in phase and magnitude to the sense and magnitude of relative displacement between the scanner orientation and the computer setting along the respective azimuth and elevation components. These outputs 89 and 91 control respective phase sensitive amplifiers 92 and 93 which thereupon control the respective servos 82 and 83 of the scanner 1 to reposition scanner 1 into correspondence with the setting of computer 7.

In this manner, by suitable control of computer 7, as by its manual orientation control 8, scanner 1 is caused to follow the orientation setting of computer 7 and its orientation may be thereby adjusted as desired.

The above action serves to set the orientation of the distant object or target in terms of its azimuth and elevation coordinates into computer 7, when the scanner and target orientations coincide. For proper operation of computer 7, however, to permit the determination of the correct gun aiming angles, it is also necessary to set therein data corresponding to the range of the target. For this purpose range pedal 10 is provided, which is actuated in the manner to be described.

As is well known, in a system of the present type using reflected pulses, the time interval or delay between the transmitted pulse and its corresponding reflected pulse is directly proportional to the distance or range of the reflecting object or target. Fig. 18 shows one type of indicating device useful for setting this range data into computer 7. Thus, control oscillator 32a serves to energize and synchronize a suitable wave squaring device 32b of any desired type producing a square wave output having the same frequency as that of control oscillator 32a. This output actuates a pulse generator 32c of conventional design suitable for deriving pulses for controlling the transmitter-modulator 31, to produce the transmitted pulses already described with respect to Figs. 13 to 16. The received reflected pulses are passed by T-R box 33 in the manner already described, and actuate the receiver 4 to produce in its output, such as 94, a signal voltage having a wave shape similar to the envelope of the received wave, such as 36 in Fig. 14.

Control oscillator 32a also feeds a variable phase shifter 96 of any suitable type whose output wave shape is then squared in a suitable wave squarer 97, which may be similar to wave squarer 32b, to derive a square wave output having a frequency identical with that of control oscillator 32a, but adjustable in phase position with respect thereto by means of phase shifter 96. It will thus be clear that the phase of the square wave output of wave squarer 97 is adjustable also with respect to the transmitted pulses and to the received pulses.

Wave squarer 32b also controls a conventional type of sweep circuit 98 to derive in its output a suitable saw-tooth sweep voltage which is impressed upon the horizontal deflecting plates 99 of cathode ray indicator 6" to provide the time base for the indications to be described. The sweep voltage preferably is constant for a half-cycle and varying during the other half cycle, whereby only a half-period is indicated on the screen of indicator 6".

The outputs of receiver unit 4 and of wave squarer 97 are combined suitably, as by superposition or addition, and are then applied to the vertical deflecting plates 101 of indicator 6". Grid 37 of tube 6 is suitably biased to produce a beam trace. There will thereby be produced on the cathode ray screen of indicator 6" an indication similar to that shown in Fig. 18A, in which the received pulses, such as 36, are superposed on a step 102 derived from the square wave output of wave squarer 97. The position of this step 102 relative to the received pulses 36 is under the control of the setting of phase shifter 96, since, as described above, the phase of the output of wave squarer 97 with respect to the received pulses 36 may be adjusted by phase shifter 96.

In operation, the operator will choose a suitable one of these pulses 36 corresponding to the target he wishes to attack, and will then match up the range index step 102 with the desired pulse. In order to effect this result he must suitably adjust the phase shifter 96. Preferably, this adjustment is made by means of a foot pedal such as 10, to which is also coupled mechanically the range input of computer 7. The amount of phase shift produced in phase shifter 96 to match the range index 102 with the desired received pulse 36a will be proportional to the actual range of the target. Hence, it is merely necessary to directly couple pedal 10 into the computer 7 to actuate the computer range control in the desired manner.

Fig. 19 shows a modification of Fig. 18. Here the transmitting and receiving circuits are the same as in Fig. 18. However, control oscillator 32a and adjustable phase shifter 96 serve to actuate a suitable pulse generator 103 adapted to produce a pulse of fixed magnitude and of predetermined duration. The duration of this pulse is preferably chosen to be substantially of the order of the duration of the reflected pulses, or slightly longer.

With switch 104 thrown to the left position, this pulse output of pulse generator 103 is combined with the output 94 of receiver unit 4 in a manner similar to that of Fig. 18, resulting in the indication shown in Fig. 19A, in which the output of pulse generator 103 provides a type of pedestal 106 which, when matched to the desired received pulse, such as 36a, assures the proper setting of the range input to the computer 7. If desired, pedestal 106 may be made negative resulting in a somewhat modified indication.

When switch 104 is thrown to the right position, a different type of indication is provided, shown in Fig. 19B. In this instance, the vertical deflecting plates of indicator 6" are controlled solely by the received wave envelope 36 obtained from output 94 of receiver 4. The pulse output of generator 103 is now applied to the intensity control grid 37 of indicator 6. Therefore, during the occurrence of these pulses, the intensity of the cathode ray beam is made greater than its intensity during the remaining portions of the sweep.

Thus, as shown in Fig. 19B, to perform range tracking the operator or gunner will adjust phase shifter 96, and hence the computer range setting, by means of range pedal 10 until the particular reflected pulse 36a corresponding to the desired target is indicated on the indicator screen with increased intensity or brightness, as shown in Fig. 19B.

The type of range control illustrated in Figs. 17, 18, and 19, is adapted for use during both the manual tracking and semi-automatic tracking operations, illustrated in Figs. 2 and 3. During manual tracking, in which the scanner 1 and computer 7 are manually actuated together, as shown in Fig. 17, it is further necessary to provide some type of indication whereby the gunner may know when he is accurately tracking with the target; that is, when scanner 1 is oriented toward the target, and the correct target orientation data is being set into computer 7.

Fig. 20 shows one type of such tracking indicator circuit. As described above, during all tracking operations, including manual, semi-automatic and full-automatic tracking, the transmitted beam is rotating about a very narrow cone, as illustrated in Figs. 7 and 7A. If the target is situated exactly along the axis of symmetry 13 (or 23) of this cone, all reflected pulses will be received with constant and equal intensity. This indicates proper tracking with the target. Should the target, however, deviate from this desired condition, as when its orientation is along axis 24 of Fig. 7, the reflected pulses will periodically vary in amplitude at a frequency equal to the spin frequency of the scanning. In effect, this produces a spin frequency modulation upon the received pulses.

Furthermore, it will be clear that the instantaneous maximum of this spin frequency modulation will occur at the instant the axis 21 of the beam is projected closest to line 24. Hence the phase of this modulation bears a relation to the spinning of the scanner which is indicative of the orientation of the reflecting object. Accordingly, the orientation of the object with respect to spin axis 13 (or 23) may be determined by comparing the phase of the modulation with the spin cycle of the scanner or, which is the same, with the sweep voltages $P_1$ and $P_2$, which will be of fixed amplitude upon operation of the switch to cut off unit 17 or 17' and have fixed phase relation to the scanner motion.

Thus, referring to Fig. 20, the receiver output 94, now comprising the received pulses 36 periodically varying in amplitude at the spin frequency, is applied to a further detector, such as 107, including a filter adapted to pass waves only of the spin frequency, whose intensity will therefore give a measure of the amount of deviation of the target from the desired orientation with respect to the tracking system, and whose phase with respect to voltages $P_1$ and $P_2$ indicates the relative orientation of the target with respect to the scanner orientation. Preferably, detector 107 also acts to fill in the wave envelope between pulses, whereby a substantially sinsusoidal output in phase with the pulse modulation is obtained.

Such phase comparisons are performed in the respective azimuth and elevation phase sensitive amplifiers 108 and 109 in Fig. 20. These amplifiers are of any conventional type adapted to produce in their outputs a unidirectional voltage corresponding in polarity and magnitude to the sense and magnitude of the component of the out of detector 107 co-phasal or anti-phasal with the reference voltage $P_1$ or $P_2$.

The respective outputs of amplifiers 108 and 109 are connected to the respective deflecting plates 99, 101 of indicator 6' and will thereby produce on its screen a bright dot, such as 111, shown in Fig. 20A, whose position relative to the pole 39 of the screen is the same as the position of the reflecting object relative to the axis of the conical scanning performed by the scanner 1 and hence indicates the displacement or "error" between scanner and target. It will be clear that the fire control officer, to perform accurate tracking, must control the settings of the computer in such a manner that spot 111 is maintained at the pole 39, in which case the scanner is oriented toward the target and the proper azimuth and elevation data corresponding to present target position are introduced into computer 7. If, at the same time, the range control 10 of the computer 7 is adjusted in the manner described with respect to Figs. 18 and 19, the complete data required by computer 7 is thus set into it, and the output of computer 7 may serve to correctly orient the guns or turrets 9 to effectively engage the target.

Fig. 21 shows a modification of the circuit of Fig. 20 adapted to produce as its indication a small circle which is displaced from the pole 39 in the same manner as spot 111. In this modification, the deflecting plates 99, 101 of indicator 6' are actuated in the same manner described with respect to Fig. 20. In addition, however, indicator 6' is provided with the usual deflecting coils, such as coils 112, the respective pairs of these coils being energized from the respective circular sweep voltages $P_1$ and $P_2$. The effect of these deflecting coils 112 is to produce a circular motion of the cathode ray trace. The effect of the deflecting plates 99, 101 is to displace the center of this circle in accordance with the scanner error, yielding the indication shown in Fig. 21A, comprising movable circle 113.

Fig. 22 shows a modification of that portion of Fig. 21 to the right of line C—C. This modification is adapted to produce the same type of indication shown in Fig. 21A. In this instance, no extra deflecting coils 112 are necessary, but the sweep voltages $P_1$ and $P_2$ are coupled directly to the deflecting plates of the indicator 6' to be superimposed upon the output waves of the respective phase sensitive amplifiers 108 and 109. Preferably, sweep voltages $P_1$ and $P_2$ are coupled to the deflecting plates by way of coupling and blocking condensers 114, which serve to isolate the two inputs to each pair of deflecting plates from one another.

It will be clear that here also the gunner must operate the scanner so as to cause the circular indication 113 to be maintained symmetrical with respect to pole 39 or to suitable cross hairs such as 116.

Fig. 23 shows a further modification of the tracking indicators of Figs. 20 to 22. Here the electron beam of cathode ray indicator 6' is caused to trace a fixed circle, such as 117, on the screen of indicator 6'. The output 94 of receiver 4 is connected to a wide-band amplifier 110 of any well known type adapted to reproduce the output wave of receiver 4 in amplified form. The output of amplifier 110 is connected to the intensity control grid 37 of indicator 6. When the scanner 1 is correctly oriented with respect to the target; that is, when the target orientation is coincident with the scanner spin axis 13, each of the reflected pulses will be of equal amplitude. Accordingly, each of the spot traces produced on the indicator screen at the instant that the reflected pulse is received will be of equal intensity. Should the target orientation differ from the scanner orientation, certain of these received pulses will be of greater amplitude, resulting in the correspondingly greater intensity of their corresponding spot traces. Under such conditions, one portion of the circular trace 117 will have greater brightness than the diametrically opposite portion. In effect, an arcuate section of circle 117 will have maximum brightness, whereas the diametrically opposite arc will have minimum brightness. The angular position of this bright arc with respect to cross hairs 116 will correspond directly to the angular position of the target with respect to the scanner. Accordingly, the operator then must actuate the scanner so as to produce equal intensity for all parts of the circle 116, in order to effect proper tracking.

The actual indication of Fig. 23A, instead of being a true circle, is really a circular arrangement of dots. In the illustrative circuit values indicated above, there would be 100 of these dots in each complete circle. If it is so desired, a signal storer, such as described with respect to Fig. 8, may be inserted to enhance the brightness of these spots. A further signal storer, having longer time constant, may be used to "run over" between spots and provide a true circular indication having increased brightness for parts thereof corresponding to the target orientation.

Fig. 24 shows a complete radio and indicator circuit combining several of the features of Figs. 20 to 23. From what has been described above, it should be clear that the indication in this instance, as shown in Fig. 24A, will be a circular trace 152 whose position with respect to pole 39 represents the scanner error, this circular trace 152 being modulated in intensity in the manner described with respect to Fig. 23.

During semi-automatic tracking the scanner orientation is automatically controlled from the receiver output. As described with respect to Figs. 20 to 24, the outputs of phase sensitive amplifiers 108 and 109 are indicative of the scanner error, that is, the relative displacement along two components between the target orientation and the scanner axis. During semi-automatic tracking these outputs are used to reposition the scanner orientation to cause it to automatically follow and track with the target. Such a circuit is shown in Fig. 25.

Here the receiver output, derived from lead 94, is demodulated in demodulator or detector 107, and passed through band pass filter 107a, passing only currents of the spin frequency. The output of filter 107a is compared with the respective sweep voltages $P_1$ and $P_2$ in the phase sensitive amplifiers 108 and 109, whose outputs control the respective azimuth and elevation servos 82 and 83 of scanner 1 to reorient scanner 1 in a direction to decrease these outputs. In this manner the scanner 1 is caused to automatically track with the target.

The computer 7, however, is still manually controlled by the fire control officer, who must so control it as to correspond to the orientation of the scanner 1. For this purpose, the outputs of the signal generators 87 and 88 are fed to phase sensitive amplifiers 92 and 93, whose outputs now control the deflection of the electron beam in indicator 6'. The deflecting plates of indicator 6' are energized from the sweep voltages $P_1$ and $P_2$ in the same manner as in Fig. 22, and it will be clear that the same type of indication as shown in Fig. 21A will be produced. In this instance, however, the position of the indicating circle 113 represents the relative displacement or error between the computer 7 and the scanner 1, which will be termed "computer error." It will be clear that, if desired, the type of indication shown in Fig. 20A or Fig. 21A may also be produced.

In operation, the fire control officer will again operate computer 7 in such manner as to cause circular trace 113 to be centrally positioned with respect to pole 39 and cross hairs 116.

During full automatic tracking, illustrated in Fig. 26, scanner 1 is actuated in the same manner shown in Fig. 25, its actuating system not being illustrated in Fig. 26. For this type of operation the computer 7 is automatically oriented by the scanner 1. Accordingly, computer 7 is provided with an elevation servo 119 and an azimuth servo 121, as well as a range servo 122. The outputs of phase sensitive amplifiers 92 and 93, again representing the computer error, now serve to control the computer servos 119 and 121 in such manner that the data set into computer 7 is caused to automatically follow and track with the orientation of the scanner 1 in a manner similar to that shown in Fig. 17, but now controlling the computer 7 instead of the scanner 1.

The range servo 122 is adapted to automatically position the range control of computer 7 in accordance with the range or distance of the target. For this purpose, an automatic range control circuit 10' is provided, actuated from the receiver output 94. This circuit 10' is preferably of the type shown in copending application Serial No. 434,403, for Pulse Receiving Systems, filed March 12, 1942 in the name of H. M. Stearns. As is therein shown, such a circuit produces a unidirectional voltage output corresponding in magnitude to the range of the target. This voltage may be used in any well known manner to actuate range servo 122 and thereby automatically set in the proper range data into computer 7.

Alternatively, a phase measuring circuit of the type shown in copending application Serial No. 375,373, filed January 22, 1941, in the name of J. E. Shepherd, which issued on March 6, 1945 as U. S. Patent No. 2,370,692, may be used as range control circuit 10', which, as is therein described, is adapted to produce a voltage output proportional to the phase difference between any two periodic waves. In this instance, the two periodic waves would be the transmitted pulses and the received pulses.

As still another modification of range control 10' there may be used the device shown in copending application Serial No. 432,290, filed February 25, 1942 in the name of W. M. Silhavy, which, as is therein shown, is adapted to position a shaft or member in accordance with the phase difference or time delay between two periodic pulse waves, such as the transmitted and received pulses in the present case. This member may directly actuate the range control of computer 7.

Indicator 6' in the case of full-automatic tracking is adapted merely to serve as a monitor, and may be connected to indicate either the scanner error or the computer error, as desired, any of the types of indication shown in Figs. 20 to 24 being used. As illustrated, in Fig. 26, indicator 6' is adapted to monitor the computer error, although it is to be understood that it could be connected to the output of amplifiers 108 and 109 to indicate a scanner error. The range of the target may also be monitored, using any of the systems of Figs. 18 or 19.

In the searching, manual, and semi-automatic tracking systems described above, separate indicators have been shown for searching indication, for range indication, and for tracking indication. It may be desired under some circumstances to provide a single indicator for all of these indications.

Fig. 27 illustrates one suitable type of such a combined indicator. In this instance four position ganged switches are used, these positions respectively corresponding to searching (S), manual tracking (M), semi-automatic tracking (SA), and full automatic tracking (A). The operation of this indicating system is substantially the same for all three types of tracking, and will be first described with respect to these tracking operations.

Thus, during tracking, the circular sweep voltages $P_1$ and $P_2$, which are now of constant amplitude as discussed above, are connected respectively to terminals 128 and 129, and led to respective blocking amplifiers 123 and 124 through suitable coupling condensers 126 and 127. Superposed on these sweep voltages $P_1$ and $P_2$ are the respective azimuth and elevation error voltages derived as in previous figures and connected to terminals 131 and 132, respectively. It will be clear that these error voltages may represent the computer error or the scanner error, depending on the particular type of tracking being used.

The outputs of amplifiers 123 and 124 are fed to respective pairs of deflecting coils 112 provided on indicator 6. Indicator 6 is also provided with the usual deflecting plates, such as the horizontal plates 99 and the vertical plates 101.

A suitable time base sweep voltage is connected as by means of terminals 133 to the input of a further blocking amplifier 134 whose output energizes the horizontal pair of deflecting plates 99. One of the vertical plates 101 is energized from the output of another blocking amplifier 136 whose input is fed from the output 94 of the receiver 4 connected at terminals 137. The second vertical deflecting plate 101 is energized from the output of a blocking amplifier 138 whose input is fed by a suitable range index voltage, similar to those discussed above with respect to Figs. 18 and 19 and connected to terminals 139.

In order to provide a suitable simultaneous indication for both range and tracking, amplifiers 123 and 124 are made operative alternately with amplifiers 134, 136, and 138. Thus, a suitable source of switching voltage, having any desired frequency, preferably higher than that corresponding to persistence of vision, is connected to terminals 141, and is fed thereby to a square wave generator 142, of any suitable conventional type, adapted to produce a square wave voltage of a frequency corresponding to the switching voltage frequency. The output of generator 142, during tracking, is fed in opposite phase to the two groups of amplifiers, namely, amplifiers 123 and 124, and amplifiers 134, 136 and 138. These amplifiers are of any well known type adapted to have their conductivity or amplifying ability controlled by an input voltage. These amplifiers are so adjusted as to be conductive and amplifying only during half cycles of predetermined polarity (such as positive) of the voltage applied thereto from square wave generator 142.

In effect, therefore, the arrangement of square wave generator 142 and blocking amplifiers 123, 124, 134, 136 and 138, during tracking, constitutes a type of double-throw electronic switch and alternately permits indicator 5 to indicate range or tracking, the rate of alternation being high enough to assure simultaneous viewing of both indications by virtue of the persistence of vision and/or the retentivity of the screen of indicator 6.

During searching, on the other hand, no range indication is necessary and accordingly, it is desirable to maintain range amplifier 138 and time base sweep amplifier 134 in a non-conductive condition. This is effected by switch 143, which, in its searching position, applies a suitable blocking potential to these amplifiers 134 and 138.

In addition, it is desirable that during searching the sweep voltages P1 and P2, which when switched to search represent the spiral sweeping of the scanner, should be continuously fed to indicator 6. This may be done by means of switch 144, which impresses a suitable unblocking potential upon amplifiers 123 and 124. At the same time, switches 146 and 147 isolate the indicator 6 from the error voltages which, therefore, have no effect upon the indication produced on the screen of indicator 6.

Lastly, it is necessary that the received wave voltage be removed from deflecting plate 101 and impressed upon the intensity control grid 37 of indicator 6. This is performed by switch 148, by throwing to its searching position S.

From the above it will be clear that during any of the tracking operations indicator 6 will produce simultaneously indications of range and tracking error, the former indication being any of the types discussed above in Figs. 18 and 19, while the latter indication may be of any of the types discussed with respect to Figs. 20 to 24. During searching, by manipulation of the four-position gang switches to the searching position, the system is adapted to produce searching indications of the type shown in Figs. 8A or 13A. There is thus provided a single unitary indicator circuit arrangement adapted for use under any of the four operating conditions discussed above, and using only a single indicator for searching, range, and tracking indications.

The source of switching voltage for interlacing the range and tracking indications may be any desired one. However, it is preferable from the point of view of avoiding excessive equipment, to use a source of voltage already contained within the system. For this reason the switching voltage may be derived from one of the sweep voltages P1 or P2. It is to be noted that during searching, when these voltages P1 and P2 are varying in amplitude, square wave generator 142 is completely ineffective by virtue of the effect of switches 144 and 143 and, accordingly, the varying amplitude of voltages P1 and P2 is immaterial. During tracking, when the switching voltage is used, the sweep voltages P1 and P2 are of constant amplitude and therefore either one may be used as the switching voltage.

Alternatively, the control oscillator 32a described in preceding figures may be used, thereby yielding a complete switching cycle during each transmitted pulse period. By so doing, each sweep of the beam produces an actual indication. If this control oscillator 32a is used, care must be taken to assure that indicator 6 is conditioned to produce the range indication during the same period that the received pulse is effective upon the vertical deflecting plates, since otherwise these pulses would not appear in the indication. Suitable phase shifting or timed delay circuits may be inserted for this purpose.

Fig. 28 shows a system of scanner and computer control adapted for selective operation under any of the four types of operation described above. As in Fig. 27, four position ganged switches are used to transfer from one type of operation to another. It will be clear that these switches may be simultaneously manually controlled, or may be controlled by relays or other remote control means.

Considering for the moment only the searching operation, in which all the transfer switches are placed in contact with terminal S, it will be understood that scanner 1 is performing the spiral scanning described above, and the spiral sweep voltages P1 and P2 are thereby being operated as described in Figs. 9-12.

Computer 7, instead of being directly actuated from manual control 11 as shown in Figs. 1-4, 17 and 25, is now actuated by servo devices, such as elevation servo 119, azimuth servo 121 and range servo 122, the latter only during tracking.

Elevation servo 119 and azimuth servo 121 may be controlled from a suitable manual control 8' shown more in detail in Fig. 29.

As shown therein, manual control unit 8' is formed in the shape of a handle bar control member 149 having usual hand grips 151. Member 149 is adapted to be rotated about a substantially vertical azimuth axis, such as 152, and also about a horizontal elevation axis, such as 153, each rotation being independent of the other. Thus rotation about elevation axis 153 causes pinion 154 to translate a circular rack 156 connected to a rod 157 at whose opposite end is a similar circular rack 158 meshing with a pinion 159. Pinion 159 is thus rotated in response to actuation of control 149 about axis 153, and varies the setting of a potentiometer 161 which is energized by a suitable source of control voltage, indicated as a battery 162, connected thereto. Connected between the variable arm 163 and the center tap 164 of potentiometer 161 is the output circuit 166. It will be clear, therefore, that actuation of control 149 about axis 153 will produce an elevation signal voltage in output wires 166 corresponding in sense and magnitude to the direction and magnitude of the control displacement.

Rotation of control 149 about vertical axis 152 produces a rotation of bevel gear 167 rotating therewith and engaging a further gear 168 which actuates a similar potentiometer and battery arrangement 169, 171 and thereby produces an azimuth signal voltage across output leads 172 corresponding in magnitude and polarity to the amount and sense of rotation about axis 152.

It will be clear that these two rotations are independent of one another, and may be made separately or together. This device provides a convenient type of control, incorporating both azimuth and elevation control, and requiring least mental effort on the part of the operator, since the setting of computer 7 and the actuation of scanner 1 thereby produced appears to follow naturally from the corresponding actuation of manual control 8'.

If desired, any other type of control adapted to produce azimuth and elevation signal voltages, such as those shown in copending application Serial No. 403,618 for Handle Tracking Control filed July 23, 1941 in the names of H. L. Hull, W. C. Hartman, and R. C. Goertz, which issued on January 14, 1947, as U. S. Patent No. 2,414,102, may be used in place of the control shown in Fig. 29. It is to be noted that the signal voltages produced need not be direct current in character, but alternating current or any other type of signal may be used.

The signal voltages thus produced are connected, during searching, to control in any suitable manner the computer servos 119 and 121, which thereby set the desired azimuth and elevation data into computer 7.

The control for the range data input to computer 7 is effected by a suitable range servo 122 which, during searching, is rendered ineffective since no range adjustment is then necessary.

The output of computer 7, representing the desired gun aiming angles, actuates suitable remote position transmitters 173 and 174, whose outputs 176 and 177 are then connected to suitable positional control devices in the gun turrets for correspondingly actuating the guns. Suitable control systems for these guns are illustrated in copending application Serial No. 424,612 mentioned above.

Suitably coupled to the data input controls of computer 7 are the computer elevation and azimuth signal generators 87 and 88, as described in Figs. 17 and 25. Corresponding transmitters 29 and 28 are fixed to the elevation and azimuth axes of the scanner 1 and are connected to generators 87 and 88, as by leads 84, 86. Accordingly, the outputs of signal generators 87, 88 as derived at leads 89 and 91 represent the relative displacement in elevation and in azimuth between computer 7 and scanner 1. These outputs are fed to the corresponding phase sensitive amplifiers 92 and 93 whose outputs then control the elevation and azimuth scanner servos 82 and 93 to reposition the scanner 1 into correspondence with the computer 7. In this way actuation of the control 8' serves to position both the computer 7 and the scanner 1 as desired by the operator. The system just described will be seen to be substantially similar to that of Fig. 17.

During manual tracking operations when all switches are thrown to the M position, the control of computer 7 and scanner 1 is performed in exactly the same manner. In this case, however, the range servo 122 is controlled from the range control pedal 10 which actuates a suitable potentiometer 187 to produce a range signal or control voltage corresponding to the desired range setting of computer 7. It will be clear that any suitable type of adjustable voltage may be used here also, including direct voltages and alternating voltages, so long as it is adapted to suitably control the range servo 122.

As described above with respect to Figs. 18 and 19, range pedal 10 is also adapted to suitably actuate a range index cooperating with indicator 6, whereby, when the operator has matched the desired indicated pulse by the range index, the proper range setting of computer 7 will have been made.

During manual tracking operations the output 94 of receiver 4 is used to indicate the scanner error in the manner shown in any of Figs. 20 to 24. Thus, the output 94 of receiver 4 is fed to respective radio signal phase sensitive amplifiers 108 and 109 to which are also respectively connected the circular sweep voltages $P_1$ and $P_2$ derived as indicated in any of Figs. 9 through 12, during tracking. The outputs of amplifiers 108 and 109 appearing as suitable direct voltages, are connected as by leads 179 to any of the indicators described in Figs. 20 to 24 or 27. Accordingly, the system will operate with manual tracking as described.

During semi-automatic tracking, with all switches in position SA, computer 7 is again actuated from manual control 8' in the same manner as just described. In this instance, however, the output of the computer signal amplifiers 92 and 93 is connected to indicator leads 179 and thereby actuates the indicator 6 in accordance with the computer error. The radio error voltages derived from amplifiers 108 and 109 now actuate the scanner servos 82 and 83, so that the scanner 1 is now automatically oriented in response to the radio signal, while the indicator will indicate the computer tracking error. The range setting of the computer 7 is effected in the same manner as during manual tracking, just described. Operation of the system is thus similar to Fig. 25.

During full automatic operation, with all switches thrown to the A position, manual control 8' is no longer effective to actuate the computer 7. Rather, the scanner 1 is automatically operated from the radio signal output from receiver 4, as in semi-automatic tracking, by the connection of the radio error voltage output of amplifiers 108 and 109 to the scanner servos 82 and 83.

The computer error voltages, now representing the displacement between the computer setting and the scanner orientation, are fed to respective phase sensitive amplifiers 181 and 182 and thereby actuate the computer servos 119 and 121. If desired, amplifiers 181 and 182 may be eliminated, in which case computer servos 119 and 121 would be actuated by the outputs of the computer error signal amplifiers 92 and 93.

Accordingly, in this type of operation, scanner 1 will automatically track with the target in response to the radio signal and computer 7 will automatically track with the scanner 1, whereby the proper azimuth and elevation data will be set into computer 7.

The proper range setting for computer 7 is derived from the automatic range circuit already described with respect to Fig. 26, which operates to maintain the range setting of computer 7 automatically at the value in which the range index and the received indication are in correspondence.

Other arrangements of amplifier could also be made. Thus a pair of indicator amplifiers and a pair of scanner servo amplifiers could be used, each selectively energized by computer or radio error voltages according to the type of operation performed.

In Fig. 30 there is shown the complete receiver, transmitter and indicator circuit including all four types of operation outlined above. Considering for the moment only the searching operation, there is provided a control oscillator 32a similar to those of preceding figures whose wave shape may be as indicated at 183 in Fig. 31A. This voltage wave 183 is fed to a suitable phase shifter 184 and thence to a wave squarer 32b similar to that of preceding figures, and adapted to convert wave 183 of Fig. 31A into a square wave such as 186 of Fig. 31B. The phase of wave 186, relative to that of wave 183, may be suitably adjusted by phase shifter 184. The output of wave squarer 32b is fed to a pulse generator 32c wherein the wave 186 is passed through suitable differentiating and clipping circuits of any known type adapted to produce the trigger pulses 187 of Fig. 31c which act in a manner well known to modulate the output of any suitable high frequency transmitter 31 to produce a wave pulse of high frequency energy having a short duration such as of the order of one micro-second. This pulse preferably has an envelope similar to that shown at 188 in Fig. 31D.

This high frequency energy is then fed through wave guide 11 to the radiating system 3 of scanner 1 and is thereby spirally projected as previously described. Should any of the transmitted pulses be reflected from a distant object, the reflected pulse would be received in radiator 3 and transmitted by wave guide 11 to the receiver 4 through T-R box 33, which, as described above, permits passage of the relatively weak intensity received pulses but blocks the receiver input to the relatively strong intensity transmitted pulses. The received pulses therefore are transmitted to the detector and amplifier section 4a of receiver 4, where the high frequency energy is converted to a suitable intermediate frequency, which is thereupon led to the intermediate frequency, second detector, and subsequent amplifier stages 4b of the receiver 4. Receiver unit 4b is preferably designed to have two parallel intermediate frequencies, detector and wide-band amplifier channels energized from the same preceding intermediate frequency amplifying stage. These channels are designated as the "wide-gate" and "narrow-gate" channels, for reasons which will be hereafter described.

Should several objects be within the range of the directional pattern emitted by the radiating system 3 at the instant in question, a plurality of pulses may be received in succession from these multiple objects, in the order of their relative nearness to the transmitting arrangement. In such a case, the wave appearing in wave guide 11 may have a modulation envelope of the wave shape shown at 189 in Fig. 31E, comprising the transmitted pulse 188 and a plurality of received pulses 191.

In order to further discriminate against the transmitted pulse 188 and also to discriminate against undesired stray pulses and atmospheric and amplifier noise, it is desirable to block the receiver unit 4b, except during the intervals in which transmission is desired. Such a blocking arrangement may be termed a "gate" since it permits passage of only certain desired pulses. To provide such a gate, a suitable square wave is generated synchronously with the radiated pulses and controls the bias of one of the intermediate frequency stages. Thus, the output of control oscillator 32a may be fed through another adjustable phase shifter 192 to wave squarer 193, to produce an output wave such as wave 194 shown in Fig. 31F. Phase shifter 192 is so adjusted that the positive portion of wave 194 is initiated at the instant that the transmitted pulse 188 ceases.

A further phase shifter 196 and wave squarer 197 are energized from the output of control oscillator 32a to produce a square wave such as that shown at 198 in Fig. 31G. Phase shifter 196 is adjusted so that the positive portion of wave 198 is initiated at a time subsequent to that of wave 194 corresponding to the desired duration or width of the gate. Such a gate circuit is illustrated schematically by rectangle 199 and preferably comprises a circuit for producing a bias voltage sufficient to bias the intermediate frequency stage 4b of the receiver 4 beyond cut off. This bias voltage is caused to be switched on, or rendered effective, by the action of wave 194 and switched off by the action of wave 198, whereby the bias voltage would have the wave shape shown at 201 in Fig. 31H. Therefore, the output of receiver unit 4b will have the form shown in Fig. 31I at 202, the transmitted pulse 188 having been eliminated, together with all stray pulses and atmospheric noise not occurring during the duration of gate 201. This output wave 202 appearing on lead 94 is fed through a signal storer 44 similar to that shown in Fig. 8, to the intensity control grid 37 of the cathode ray indicator 6.

The horizontal deflecting plates 99 of indicator 6 are energized from an amplifier 203 which is preferably of the type which is balanced with respect to ground, whereby the deflections of the electron beam caused by the voltages on plates 99 will be symmetrical. The input to amplifier 203 is derived from an electronic switch 204, of any suitable type, adapted to alternately transmit one or the other of its two inputs 206, 207. As is well known, the switching of such a device may be placed under the control of a switching square wave which may be fed into switch 204 by means of its input 208. Amplifier 203 and electronic switch 204 are preferably of the type shown in copending application Serial No. 447,534, filed June 18, 1942, in the names of J. E. Shepherd, et al.

Vertical plates 101 of indicator 6 are energized from a similar amplifier 209 which is also fed from a similar electronic switch 211 adapted to alternately transmit one or the other of its inputs 212 and 213 under the control of a switching wave applied to input 214. During searching, however, electronic switches 204 and 211 are suitably biased as over lead 216 to continuously transmit inputs 207 and 213 and to continuously block inputs 206 and 212.

During searching the output wave 186 of wave squarer 32b is suitably delayed, as by a delay circuit 217, to produce a wave 218 shown in Fig. 31J having a time delay such as 219 with respect to the wave 186. This time delay is preferably chosen so that the positive part of the wave 218 is initiated substantially simultaneously with the transmitted pulse 188. This wave 218 may be designated as the "sweep square wave" since, as will be seen, from it is derived the sweep voltage for the range indication to be described hereafter.

The sweep square wave 218 during searching is fed to the input of the "wing" circuit 221 which thereby produces a highly damped high frequency oscillatory wave, such as wave 222 in Fig. 31K. Circuit 221 may be similar to that shown in Fig. 13. This highly damped oscillatory wave 222 is supplied to input 207 of electronic switch 204. Also supplied to input 207, as by way of line 62 and coupling condenser 114, is one of the two spiral sweep voltages, indicated in this instance as being voltage $P_2$. Input 213 of electronic switch 211 is supplied from the other spiral sweep voltage, such as $P_1$, by way of lead 61 and coupling condenser 114.

In this way it will be clear that the circuits so far described will operate substantially identically with the switching circuit described with respect to Figs. 13 to 16, to provide the indication of the approximate orientation and rough range of any objects or targets within the scanning range of the apparatus, as shown in Fig. 13A.

During manual tracking, when all four position switches are moved to the manual tracking or M position, transmitter 31 operates as before to produce the recurring sequence of short pulses 188 of high frequency energy. The time sequence of various portions of the receiver and indicator circuit is now as shown in Fig. 32. It is to be understood that time curves A to F of Fig. 31 are also applicable to tracking operation and may be considered to be part of Fig. 32.

During tracking, gate circuit 199 is preferably adjusted to provide a gate of shorter duration than during searching. This may be done by readjusting phase shifter 196 whereby the output of wave squarer 197 will be as shown at 198'' in Fig. 32G, wherein the positive part of the square wave 198' is initiated at a time in the transmitted pulse cycle sooner than wave 198 of Fig. 31G. Preferably this is done by a further section 200 of the ganged four-position change over switch.

As a result, the gate circuit 199 will now provide a voltage output as shown at 201' in Fig. 32H and the resulting wave passed by receiver unit 4b will be as shown at 202', some of the later pulses being thereby eliminated. This wave 202' will therefore be the output of the wide channel of receiver unit 4b and will appear on output lead 94. This output 202' is then connected to the input to vertical amplifier 209 where it is suitably superposed upon the output of electronic switch 211, the reason for which will later appear.

The narrow channel of receiver 4b is fed with the same wave 202' and is controlled by a further gate derived from gating circuit 223. Gate circuit 223 may be termed the "narrow gate" circuit and preferably provides a gate of a duration only slightly larger than the duration of the received pulse corresponding to the desired target to be indicated and tracked.

This gate circuit 223 is adapted to be turned on by a square wave derived from wave squarer 97, which is under the control of a variable phase shifter 96 energized from control oscillator 32a. Phase shifter 96 is adapted to be actuated by a foot pedal 10 which, as will be seen, controls the position of the range index appearing on the screen of indicator 6. Pedal 10 also actautes the range setting of the computer 7 in the manner described with respect to Figs. 18 and 19.

The output of wave squarer 97 may be as shown at 224 in Fig. 32J, and may be termed the range index square wave. It will be clear that the position of the step 225 is adjustable in time phase with respect to the received pulse 191 by operation of range pedal 10.

Narrow gate circuit 223 is adapted to be turned off by the same output wave 224 after a predetermined time, determined by the additive effects of delay circuits 226 and 227 connected to wave squarer 97, thereby producing a voltage output as at 228 in Fig. 32K. The time delay of each of delay circuits 226 and 227 is made very short, preferably substantially equal to the duration of the received pulse 191.

The output of narrow gate circuit 223 during tracking is applied as a bias to one of the intermediate frequency stages of the narrow channel of receiver 4b whose output wave, obtained as at lead 234, may be as shown at 235 in Fig. 32L, now comprising merely the desired pulse 191 substantially stripped of all other pulses and amplifier noise.

This pulse 191 is fed to a suitable signal storer 44' to produce an output voltage at lead 236 of the shape shown at 237 in Fig. 32M. This voltage is then fed to the intensity control grid 37 of cathode ray tube indicator 6. The function of signal storer 44', as will be seen, is to carry over the intensifying voltage to appear during the orientation indicating period, when the received pulses themselves no longer exist.

The wave 235 of Fig. 32L output from the narrow channel of receiver 4b is also fed to a suitable automatic volume control circuit 238 of any well known type, which produces therefrom a bias voltage corresponding to the average intensity of the received pulse 191. This bias voltage is superposed on the output of wide gate circuit 199 to control the signal amplification of the early intermediate frequency stages of receiver 4b in such manner as to maintain the magnitude of the received pulse 191, derived in output 234 of receiver 4b, at a predetermined level. It is to be noted that in this way noise and undesired pulses have no effect on the automatic volume control, which is responsive solely to the desired pulses 191.

The wave obtained from delay circuit 226 at lead 229 will be similar to the wave 224 of Fig. 32J but delayed approximately by the amount of duration of the received pulse 191, and thus may be as shown at 231 in Fig. 32Q. This wave 231 may be termed the "range index wave" and during tracking is connected to the input 212 of electronic switch 211.

The input 206 to electronic switch 204 during tracking is energized by the output of the sweep circuit 232 which is controlled by the sweep square wave 218 of Fig. 31J. This sweep circuit may be of any conventional type adapted to produce a linear or, alternatively, an exponential sweep wave similar to that shown at 233 in Fig. 32N.

Electronic switches 211 and 204 are placed under the control of a switching wave connected to their inputs 203 and 214 during tracking, which wave is derived from the output of wave squarer 197 having the wave shape shown at 198' in Fig. 32G. Accordingly, during each repetition period of the transmitted pulses, electronic switches 204 and 211 will pass through one complete cycle; that is, for half the period will transmit their inputs 207 and 213, and for the remaining half of the period will transmit their inputs 206 and 212. These periods of conduction and non-conduction are shown respectively in Figs. 32R and 32S. It will be seen that the instant of change-over corresponds to the initiation of the positive portion 233 of the switching wave 198' of Fig. 32G.

During tracking, intensity control grid 37 has applied to it the resultant of two voltages, one voltage being derived from signal storer 44' by means of lead 236 and being shown by curve 237 of Fig. 32M, the other being derived from intensifiers I and II. The function of these intensifiers 239 and 241 is to condition the electron beam to produce a trace upon the screen during the desired periods, of an intensity corresponding to the instantaneous magnitude of wave 237. Thus, intensifier 239 is adapted to produce a voltage pulse such as 242 in Fig. 32P. This pulse is initiated by the sweep square wave 218 of Fig. 31J, derived from wave squarer 32b after the time delay 218 produced by delay circuit 217, and is terminated by the sweep wave 193' derived from wave squarer 197 producing thereby the pulse 242 of Fig. 32P. During this interval 243, the cathode ray beam is conditioned to produce a trace when the wave 237 is superposed on pulse 242.

For a short interval 244 after the termination of pulse 242, determined by the time delay of delay circuit 246 connected to the output of the switching wave squarer 197, intensity grid 37 is conditioned to prevent any beam trace on indicator 6 by the suppression of any output from intensifiers 239, 241. However, after the interval 244, the switching wave 198' delayed by delay circuit 246, initiates a second cathode beam conditioning pulse 247 by means of intensifier 241.

Intensifier 241 is adapted to produce a pulse 247 whose initiation is under the control of switching wave 198' and which is of a predetermined fixed duration 248, as shown in Fig. 32P. Accordingly, the electron beam is conditioned during interval 243 of pulse 242 to be responsive in intensity to the wave 237 derived from signal storer 44'. For the interval 244, the beam is conditioned to produce no trace whatsoever. During the succeeding interval 248 corresponding to the duration of pulse 247, the electron beam is again conditioned by pulse 247 to give a trace having intensity corresponding to the magnitude of wave 237 at each instant.

It will be seen that the interval 244, during which the beam is cut off, is the same interval immediately succeeding the initiation of electronic switching, as at 238 in Fig. 32R. The interval 244 is of sufficient duration to cut out any traces of the return sweep from one type of indication and the building up trace of the second type of indication to be described, whereby two distinct and separate indications are produced without disturbing return or building up traces.

Input 212 of electronic switch 211 is now derived from the range index wave shown at 231 in Fig. 32Q. Input 213 of electronic switch 211 during tracking is derived from the circular sweep voltage P₁ through coupling condenser 114 upon which is superposed the unidirectional elevation error voltage, in the case of manual tracking corresponding to scanner error, as discussed with respect to Figs. 2, etc. and which is derived as shown in Fig. 28.

Input 206 of electronic switch 204 is now derived from the sweep circuit 232 preferably having the wave shape shown at 233 in Fig. 32N. It is to be understood that a linear sweep wave may be used here if desired. Input 207 of switch 204 is derived from the second circular sweep voltage P₂ through coupling condenser 114 upon which is superposed the unidirectional azimuth error voltage, also corresponding to the scanner error during manual tracking also derived as in Fig. 28.

During interval 249 (Fig. 32R) inputs 207 and 213 are transmitted by electronic switches 204 and 213. However, an indication will appear on the screen of indicator 6 only during interval 248 (Fig. 32P) since only then is the beam controlled to yield a trace on the screen. This indication will clearly correspond to that shown in Fig. 24A, comprising the "crescent modulated" circle displaced from the pole 39 by the amount and in the direction of the scanner error, the crescent modulation being obtained by the variation of intensity of received pulses 191 during the spin cycle.

During the remaining period 251 (Fig. 32R) in which electronic switches 204 and 212 pass their inputs 206 and 211, the horizontal deflecting plates 99 are energized by the sweep voltage 233 (Fig. 32N) while the vertical plates 101 are energized by the range index 231 (Fig. 32Q) superposed upon the wide channel received pulse wave 202' (Fig. 32I) and, accordingly, the indication will be similar to that shown in Fig. 18A but showing only the particular received pulses which pass the wide gate 201' of Fig. 32H. The rapid switching action at the frequency of control oscillator 32a insures simultaneous viewing of these two indications, due to persistence of vision and screen retentivity. Thus, the circuit of Fig. 30 is adapted to produce the same simultaneous range and tracking indications described with respect to Fig. 27, with much improvement in readability and utility because of the better individual control of the various portions of the system and the use of the pulse gates to cut out undesired portions of the received wave. In addition, it will be seen that a complete range indication and a portion of the orientation indication are given in each cycle of the radiated pulses, resulting in an intenser range indication than could be given, for example, by the device of Fig. 27, where the range indication is effective during only half of the total number of cycles of radiated pulses.

During semi-automatic tracking or manual automatic tracking the circuit of Fig. 30 operates in exactly thes same manner as just described, the only difference now being that the error voltages input to electronic switches 204 and 211 now represent the computer error rather than the scanner error as they did during manual tracking, these voltages being derived as shown in Fig. 28.

During full automatic operation the circuit of Fig. 30 again operates in the same manner with the exception that the narrow gate circuit 223 is now replaced by the automatic range gate circuit 253 connected to the output 234 of the narrow channel or receiver 4b. This automatic range gate circuit 253 may be similar to the automatic pulse gate described in above-mentioned copending application Serial No. 434,403, or Serial No. 432,290, each of which shows automatic means for causing a narrow gate to track with a variable phase input pulse. Also each of these applications shows means for deriving a unidirectional voltage corresponding in magnitude to the relative phase position of the input pulse which, in this case, will be the output pulse of the narrow channel of receiver 4b. This voltage, derived from lead 254, is now used to provide the automatic range signal for controlling the computer range servo 122 shown in Fig. 28.

During automatic tracking also, the range index applied to indicator 6 is no longer derived from the wave squarer 97 as in the previous types of operation but is now derived from the automatic range gate 253 and its resulting indication on the screen of indicator 6 merely serves as a monitoring indicator in the same manner as does the tracking indication. It will be clear that the gated pulse itself may serve as a range index, after the fashion of Fig. 19A. The error voltages applied to electronic switches 211 and 204 during full automatic tracking may represent either computer error or scanner error, as desired, as shown in Fig. 28.

It is to be noted that the output 94 of the wide channel of receiver 4b need not be connected to vertical amplifier 209 as shown but may be directly connected to input 212 of electronic switch 211. Thus, during period 251 of Fig. 32R wherein the range indication is given, this wide channel output wave 202' of Fig. 32I will be superposed upon the range index wave 231 of Fig. 32Q as is desired. During the other half 249 of the switching period input 212 of switch 211 is blocked and accordingly the output 94 of the wide channel of receiver 4b has no effect upon the indication, as is also desired.

Alternatively, output 94 of the receiver wide channel may be connected directly to the output of electronic switch 211, where, during range indication (period 251 of Fig. 32S) it's wave 282' (Fig. 32I) is superposed on range index wave 231 (Fig. 32Q). During the tracking indication period 249 (Fig. 32R), wide channel output 94 is zero, as shown by wave 282' (Fig. 32I) so it has no effect on the range indication.

Accordingly, there has been described in Figs. 28 to 32 a complete unified system adapted for operation under any of the four types disclosed above, which will provide suitable indications of the range and tracking condition for an automatic radio gun laying system, including highly developed circuits for assuring accurate and suitable indications of the desired quantities while excluding all extraneous and unnecessary quantities which might have the effect of impairing the accuracy or usefulness of the indications produced.

As many changes could be made in the above construction and many apparently widely different embodiments of this invention could be made without departing form the scope thereof, it is intended that all matter contained in the above description or shown in the accompanying drawings shall be interpreted as illustrative and not in a limiting sense.

Having described our invention, what we claim and desire to secure by Letters Patent is:

1. An object detecting system comprising means for producing a periodic pulse wave of electromagnetic energy, means for directionally radiating said pulse energy in spiral fashion over a predetermined portion of space, means for receiving that portion of said energy reflected from a distant object, a cathode ray tube, means for spirally scanning the cathode ray beam thereof in synchronism with the spiral radiation of said energy, means for normally rendering said beam ineffective to produce an indication, and means responsive to reception of said reflected pulse energy for causing said beam to produce an indication, whereby the orientation of said object with respect to said system is indicated.

2. The method of indicating the orientation of a distant object with respect to a predetermined directional axis comprising the steps of producing a periodic pulse wave of electromagnetic energy, radiating said wave in a directional beam having a longitudinal axis, directing said directional axis in the general direction of said object and rotating said longitudinal axis of said beam about said directional axis and at a small angle thereto, receiving pulses reflected from said object, resolving the modulation envelope of the received pulses into components proportional to the azimuth and elevation components of the angle between said directional axis and the direction toward said object and indicating the resultant of said two components.

3. In a tracking system including a transmitting device for producing a wave of electromagnetic energy and a receiving device for receiving electromagnetic wave energy reflected from an object, at least one of said devices having a highly directional characteristic, the method of measuring the displacement of an object relative to a predetermined axis which comprises directing said axis in the general direction of said object, rotating said directional characteristic about said axis and at a small angle thereto, filtering the received energy to eliminate therefrom all but the selected signal reflected from said object, and resolving the amplitude value of the received energy into at least one component measurable along one of the two rectilinear coordinates of the instantaneous angular position of said directional characteristic for said amplitude value.

4. In a tracking system including a transmitting device for producing a wave of electromagnetic energy and a receiving device for receiving electromagnetic wave energy reflected from an object, at least one of said devices having a highly directional characteristic, the method of measuring the displacement of an object relative to a predetermined axis which comprises directing said axis in the general direction of said object, rotating said directional characteristic about said axis and at a small angle thereto, filtering the received energy to eliminate therefrom all but the selected signal reflected from said object, generating a voltage of the same frequency as said rotation, and resolving the amplitude value of the received energy by phase comparing the received energy with said generated voltage to provide a voltage whose amplitude is a measure of that component of the received energy having a predetermined phase relation to said generated voltage.

5. In a tracking system including a transmitting device for producing a wave of electromagnetic energy and a receiving device for receiving electromagnetic wave energy reflected from an object, at least one of said devices having a highly directional characteristic, the method of measuring the displacement of an object relative to a predetermined axis which comprises directing said axis in the general direction of said object, rotating said directional characteristic about said axis and at a small angle thereto, filtering the received energy to eliminate therefrom all but the selected signal reflected from said object, generating a two-phase voltage of the same frequency as said rotation, and resolving the amplitude value of the received energy into two components by phase comparing the received energy with said generated voltage and providing voltages as measures of those components of the received energy having predetermined phase relations to each phase of the generated voltage.

6. In a tracking system including a receiver for receiving electromagnetic wave energy reflected from an object and having a highly directional characteristic, the method of measuring the displacement of an object relative to a predetermined axis which comprises directing said axis in the general direction of said object, rotating said directional characteristic about said axis and at a small angle thereto, filtering the received energy to eliminate therefrom all but the selected signal reflected from said object, and resolving the amplitude value of the received energy into at least one component measurable along one of the two rectilinear coordinates of the instantaneous angular position of said directional characteristic for said amplitude value.

7. In a tracking system including a receiver for receiving electromagnetic wave energy reflected from an object and having a highly directional characteristic, the method of measuring the displacement of an object relative to a predetermined axis which comprises directing said axis in the general direction of said object, rotating said directional characteristic about said axis and at a small angle thereto, filtering the received energy to eliminate therefrom all but the selected signal reflected from said object, generating a voltage of the same frequency as said rotation, and resolving the amplitude value of the received energy by phase comparing the received energy with said generated voltage to provide a voltage whose amplitude is a measure of that component of the received energy having a predetermined phase relation to said generated voltage.

8. In a tracking system including a receiver for receiving electromagnetic wave energy reflected from an object and having a highly directional characteristic, the method of measuring the displacement of an object relative to a predetermined axis which comprises directing said axis in the general direction of said object, rotating said directional characteristic about said axis and at a small angle thereto, filtering the received energy to eliminate therefrom all but the selected signal reflected from said object, generating a two-phase voltage of the same frequency as said rotation, and resolving the amplitude value of the received energy into two components by phase comparing the received energy with said generated voltage and providing voltages as measures of those components of the received energy having predetermined phase relations to each phase of the generated voltage.

9. A radio searching and tracking system comprising means for producing a periodic pulse wave of electromagnetic energy, means for radiating said wave in a beam, means for sweeping said beam over a predetermined portion of space, means for receiving pulses reflected from a distant object, means for periodically blocking said receiving means in synchronism with said radiated pulses except during an interval beginning with the radiation of said pulses and having a duration corresponding to the maximum range of an object to be indicated by said system, means responsive to said received pulses for indicating the approximate orientation of said object, means for converting said sweeping of said beam into a rotation of said beam about an axis, means for simultaneously reducing said interval, and means for simultaneously converting said indicating means to indicate the relative displacement between said axis and the orientation of said object.

10. A radio searching and tracking system, comprising means for transmitting a periodic pulse wave of electromagnetic energy, means for receiving pulses reflected from a distant object, at least one of said means having a directional characteristic, means for sweeping said directional characteristic over a portion of space, gating means controlling said receiving means to pass received pulses solely during periodic intervals of certain duration, means responsive to said passed pulses for indicating the orientation of said object, means for converting said sweeping into a fine tracking scanning motion, and means for simultaneously reducing the duration gating interval.

11. A radio searching and tracking system comprising means for producing a periodic pulse wave of electromagnetic energy, means for radiating said wave in a beam, means for spirally sweeping said beam over a predetermined portion of space, means for receiving pulses reflected from a distant object, means responsive to said received pulses for indicating the approximate orientation and approximate range of said object, means for converting said spiral sweeping into a circular rotation about an axis, and means for simultaneously converting said indicating means to indicate the relative displacement between said axis and the orientation of said object and to indicate the accurate range of said object.

12. A radio searching and tracking system as in claim 11, wherein said converted indicating means comprises a cathode ray tube, means for periodically sweeping the cathode ray beam of said tube in a circle and for displacing said circle in accordance with said relative displacement, and means operable alternately with said circular beam sweeping for indicating the time relation between said transmitting and said received pulses and for superposing a range index wave on said time relation indication.

13. A radio searching and tracking system as in claim 11, wherein said indicating means comprises a cathode ray tube, and said approximate range and orientation indicating means comprises means for producing a spiral sweep voltage for scanning the electron beam of said tube in synchronism with the spiral sweeping of said wave, and means for controlling the intensity of said electron beam by said received pulses.

14. A radio searching and tracking system comprising means for producing a periodic pulse wave of electromagnetic energy, means for radiating said wave in a beam, means for spirally sweeping said beam over a predetermined portion of space, means for receiving pulses reflected from a distant object, means responsive to said received pulses for indicating the approximate orientation of said object, means for converting said spiral sweeping into a circular rotation about an axis, and means for simultaneously converting said indicating means to indicate the relative displacement between said axis and the orientation of said object.

15. A radio searching and tracking system comprising means for producing a wave of electromagnetic energy, means for radiating said wave in a beam, means for sweeping said beam over a predetermined portion of space, means for receiving energy reflected from a distant object, means responsive to said received wave for indicating the approximate range and orientation of said object, means for converting said sweeping motion into a movement of rotation of said beam about and at a small angle to a directivity axis, and means for simultaneously converting said indicating means to indicate the relative displacement between said directivity axis and the orientation of said object, and to indicate the range of said object.

16. A radio searching and tracking system comprising means for producing a wave of electromagnetic energy, means for radiating said wave in a beam, means for sweeping said beam over a predetermined portion of space, means for receiving energy reflected from a distant object, means responsive to said received energy for indicating the approximate orientation of said object, means for converting said sweeping motion into a movement of rotation of said beam about and at a small angle to a directivity axis, and means for simultaneously converting said indicating means to indicate the relative displacement of said directivity axis and the orientation of said object.

17. A radio control system comprising means for producing a periodic pulse wave of electromagnetic energy, means for radiating said wave in a beam, means for rotating said beam about an axis, means for receiving pulses reflected from a distant object, a cathode ray tube, means for periodically sweeping the cathode ray beam of said tube in a circle, means responsive to said received pulses for displacing said circle in accordance with the relative displacement between said axis and said object orientation, and means alternately operative with said sweeping and displacing means for indicating the time relation between said transmitted and said received pulses and for superposing a range index on said time relation indication.

18. A tracking indicating system comprising means for producing a periodic pulse wave of electro-magnetic energy, means for radiating said energy in a beam, means for rotating said beam about an axis, means for receiving pulses reflected from a distant object, a cathode ray tube, means responsive to said received pulses for periodically displacing the electron beam of said tube in accordance with relative displacement between said axis and the orientation of said object, means operative alternately with respect to said beam displacing means for indicating on said cathode ray tube the wave envelope of said received wave, and means for superposing a range index voltage adjustable in phase with respect to said indicated received wave envelope.

19. A radio control system comprising means for radiating a periodic pulse wave of radiant energy, means for receiving pulses reflected from a distant object, means for producing a switching wave of the same frequency as said transmitted pulses and synchronized therewith, means responsive to said received pulses for indicating the range of said distant object, means also responsive to said received pulses for indicating the relative orientation of said distant object, and means under the control of said switching wave for causing said range and said orientation indications to be alternately produced.

20. In a radio control system, means for producing a beam of radiant energy, means for rotating said beam about and at a small angle to a directivity axis, means for receiving energy reflected from a distant object, means responsive to said received energy for indicating the range of said object, and means also responsive to said received energy for indicating the relative orientation of said directivity axis in azimuth and elevation with respect to said object orientation alternately with respect to said range indication.

21. A tracking indicating system comprising means for producing a wave of electromagnetic energy, means for radiating said wave in a beam, means for rotating said beam about and at a small angle to a directivity axis, means for receiving energy reflected from a distant object, means responsive to said received energy for indicating the relative displacement between said directivity axis and said object orientation, and means also responsive to said received energy for simultaneously producing an indication of the range of said object.

22. A radio gun control system comprising scanner means for defining a radio line of sight, a gun computer adapted to determine gun aiming angles from present target position data set therein, means for selectively controlling said line of sight to track with the setting of said computer or with the orientation of a distant target, means synchronously selective with said last named means for indicating the relative lack of correspondence between said line of sight and said target or between said line of sight and said computer setting, and means synchronously selective with said two last named means for setting said computer manually to reduce said lack of correspondence between said line of sight and said target orientation or in accordance with the relative lack of correspondence between said line of sight and said computer setting.

23. In a radio gun control system, comprising scanner means for defining a radio line of sight, a gun computer adapted to determine gun aiming angles from present target position data set therein, means for selectively controlling said line of sight to track with said computer setting or with the orientation of a distant target, means for selectively indicating the relative lack of correspondence between said line of sight and said target orientation or between said line of sight and said computer setting, and means for selectively setting said computer manually or in accordance with the relative lack of correspondence between said line of sight and said computer setting.

24. A radio gun control system as in claim 23, further comprising means for setting range into said computer, and means for selectively controlling said range setting means by manual means or automatically in response to the range of said distant target.

25. A radio gun control system as in claim 23, wherein the tracking of said line of sight with said target, the indication of lack of correspondence between said line of sight and said target orientation, and the setting of said computer in accordance with lack of correspondence between said line of sight and said computer setting are simultaneously produced.

26. A radio gun control system as in claim 23, wherein the tracking of said line of sight with said target, the indication of lack of correspondence between said line of sight and said computer setting, and the manual setting of said computer are simultaneously produced.

27. A radio gun control system as in claim 23, wherein the tracking of said line of sight with said computer setting, the indication of lack of correspondence between said target orientation and said line of sight, and the manual setting of said computer are simultaneously produced.

28. A radio control system comprising means for radiating a periodic pulse wave of radiant energy, means for receiving pulse energy reflected from a distant object, said receiving means comprising a dual channel receiver, means for permitting transmission of said received pulses through one of said channels only for a predetermined portion of each transmitted pulse cycle beginning at the instant of radiation of said radiated pulses, said interval being chosen in accordance with the maximum range of an object from which reflected energy is to be received, means responsive to pulses transmitted through said one channel during said interval for indicating the range of said idistant object, means for blocking passage of pulses through said second channel except during a short interval of the same order of duration as pulses, means for adjusting the time phase of said short interval with respect to said radiated pulses, means responsive to adjustment of said interval for superposing a range index voltage on said range indication, and means responsive to pulses passing through said second channel during said short interval for indicating the orientation of said object and for automatically controlling the amplitude of said received wave.

29. A radio control system as in claim 28, further comprising means for alternately indicating said range and said orientation upon a common indicator.

30. A radio control system comprising means for radiating a periodic pulse wave of radiant energy, means for receiving pulse energy reflected from a distant object, said receiving means comprising a dual channel receiver, means responsive to pulses passing through one of said channels for indicating the wave envelope of said received pulses, means for superposing a phase-adjustable range index voltage on said indication, means responsive to pulses passing through the other of said channels for indicating the orientation of said object, gate means adjustable in time phase with respect to said radiated pulses for permitting passage of waves through said other channel only for a predetermined portion of each period of said radiated pulses, and means responsive to phase adjustment of said range index voltage into correspondence with a predetermined pulse of said predetermined pulse, whereby the effect of other pulses and the noise waves on said orientation indication is substantially eliminated.

31. In an object detecting system, a receiver comprising a first channel for detecting energy received from an object, a gated channel for periodically detecting energy received during a small selected time interval, and an automatic volume control circuit for controlling the gain of both of said channels according to the output level of said gated channel.

32. In an object detecting system, a receiver comprising a wide gated channel for periodically detecting energy received from an object during a selected time interval, a narrow gated channel for periodically detecting energy received from said object during a small selected portion of said interval, and an automatic volume control circuit for controlling the gain of both of said channels according to the output level of said narrow channel.

33. In an object detecting system, a pulse receiver comprising a channel for detecting energy received from an object, a gated chanel for periodically detecting energy received during a small selected time interval, means for adjusting the phase relation of said gated channel to correspond to the time phase of pulse received from a selected object, and an automatic volume control circuit for controlling the gain of both of said channels according to the output level of said gated channel.

34. In an object detecting system, a receiver comprising a wide gated channel for periodically detecting energy received during a selected time interval, a narrow gated channel for periodically detecting energy received during a small selected portion of said time interval, means for adjusting the time interval of said wide gated channel, means for independently adjusting the time phase of said narrow gated channel relative to said wide gated channel, and an automatic volume control circuit for controlling the gain of both of said channels according to the output level of said narrow gated channel.

35. In a radio searching and tracking system, means for producing a periodic pulse wave of radiant energy, means for radiating said wave in a beam, means for rotating said beam, means for receiving pulses reflected from a distant object, means for periodically blocking said receiving means in synchronism with said transmitted pulses for a predetermined portion of the period of said transmitted pulses, whereby the effects of extraneous noise waves are reduced, means responsive to said received pulses for indicating the range of said object during the unblocked condition of said receiving means, and means also responsive to said received pulses for indicating the relative displacement between said beam and said object during said blocked interval.

36. An object detecting system comprising a directional antenna, means for spirally scanning the directivity axis of said antenna over a portion of space, a cathode ray tube having an indicating screen, means controlled by the scanning movements of said antenna for applying deflection signals to said tube to cause the beam thereof spirally to scan said indicating screen, a radio transmitter and receiver connected with said antenna, means for blocking direct transmission of energy from said transmitter to said receiver, and means responsive to energy reflected from an object for causing said beam to produce an indication on said screen according to the orientation of the object with respect to said antenna.

37. An object detecting system comprising means for transmitting pulses of electromagnetic energy, means for receiving that portion of said energy pulses reflected from an object, one of said means being highly directive about an axis, means for spirally scanning said axis over a portion of space, a cathode ray tube having means controlled by the scanning movements of said axis for applying deflection signals to said tube to spirally scan the beam thereof over said indicating screen, means controlled by said receiving means responsive to the reception of energy from an object for causing said beam to produce an indication on said screen according to the orientation of the object, and means responsive to the time interval between transmitted and received pulses for providing a measure of the range of said object.

38. An object detecting system comprising means for transmitting pulses of electromagnetic energy, means for receiving that portion of said energy pulses reflected from an object, one of said means being highly directive about an axis, means for spirally scanning said axis over a portion of space, a cathode ray tube having means controlled by the scanning movements of said axis for applying deflection signals to said tube to spirally scan the beam thereof over said indicating screen, means controlled by said receiving means responsive to the reception of energy from an object for causing said beam to produce an indication on said screen according to the orientation of the object, and means responsive to the time interval between transmitted and received pulses for distorting said indication according to the range of said object.

39. A tracking indicating system comprising means for transmitting electromagnetic energy, means for receiving that portion of said energy reflected from an object, one of said means having a highly directional characteristic and a directional axis, means for causing rotation of said directional characteristic about said directional axis, means for resolving the received energy into two components proportional respectively to the azimuth and elevation components of the angle between said directional axis and the direction toward said object, and indicating means controlled by said two components for indicating the relative displacement between said directional axis and the direction toward said object.

40. In a tracking indicating system comprising means for transmitting electromagnetic energy, means for receiving that portion of said energy reflected from an object, one of said means having a highly directional characteristic, means for causing rotation of said directional characteristic about a predetermined axis, means for generating a voltage of the same frequency as the rotation of said directional characteristic, means for comparing the received energy with said generated voltage whereby to provide a voltage as a measure of that component of the received energy having a predetermined phase relation to said generated voltage, and indicating means controlled by said last-mentioned voltage for indicating the relative displacement of said object and said axis along one coordinate.

41. A tracking indicating system comprising means for transmitting electromagnetic energy, means for receiving that portion of said energy reflected from an object, one of said means having a highly directional characteristic and a directional axis, means for causing rotation of said directional characteristic about said directional axis, means for generating a two-phase voltage of the same frequency as said rotation, and indicating means responsive to the amplitude of components of received energy having a predetermined phase relation with respect to each phase of said generated voltage for indicating relative displacement between the direction toward said object and said directional axis.

42. In a tracking indicating system comprising means for transmitting electromagnetic energy, means for receiving that portion of said energy reflected from an object, one of said means having a highly directional characteristic, means for causing rotation of said directional characteristic about a predetermined axis, means for generating a voltage of the same frequency as the rotation of said directional characteristic, means for comparing the received energy with said generated voltage whereby to provide a voltage as a measure of that component of the received energy having a predetermined phase relation to said generated voltage, a cathode ray tube, and means responsive to said last-mentioned voltage for positioning a trace on the screen of said tube along one coordinate of said screen whereby to indicate a component of relative displacement of said object and said axis.

43. A tracking indicating system comprising means for transmitting electromagnetic energy, means for receiving that portion of said energy reflected from an object, one of said means having a highly directional characteristic and a directional axis, means for causing rotation of said directional characteristic about said directional axis and at a small angle with respect thereto, means for generating a voltage of the same frequency as the rotation of said directional characteristic and of a constant maximum amplitude, a cathode ray tube, and means responsive to the amplitude of the modulation envelope of received energy having a predetermined phase relation to said rotation for applying deflecting fields to said tube for positioning the electron beam thereof according to the relative displacement between the direction toward said object and said directional axis.

44. A tracking indicating system comprising means for transmitting electromagnetic energy, means for receiving that portion of said energy reflected from an object, one of said means having a highly directional characteristic, means for causing rotation of said directional characteristic about a predetermined axis, means for generating a voltage of the same frequency as the rotation of said directional characteristic, a cathode ray tube, means for causing a circular trace to appear on the screen of said tube, and means responsive to the amplitude of the modulation envelope of received energy having a predetermined phase relation to said rotation for positioning said circular trace according to the relative displacement of said object and said axis.

45. A tracking indicating system comprising means for transmitting electromagnetic energy, means for receiving that portion of said energy reflected from an object, one of said means having a highly directional characteristic, means for causing rotation of said directional characteristic about a predetermined axis, means for generating a voltage of the same frequency as the rotation of said directional characteristic, a cathode ray tube, means for causing a circular trace to appear on the screen of said tube, and means responsive to the amplitude of the modulation envelope of received energy having a predetermined phase relation to said rotation for controlling the intensity of said circular trace to indicate the relative displacement of said object and said axis.

46. In an object detecting system, apparatus for indicating the orientation of an object comprising a directional antenna, means for spirally scanning the directivity axis of said antenna over a portion of space, an indicator including means for causing said indicator to trace a spiral path in synchronism with said directivity axis of said antenna, a radio transmitter and receiver connected with said antenna, means for blocking direct transmission of energy from said transmitter to said receiver, and means controlled by the energy received by said antenna for effecting an indication by said indicator of the position of said antenna at the time said energy is received.

47. In an object detecting system, apparatus for indicating the orientation of an object comprising a directional antenna, means for moving the directivity axis of said antenna about a first and second, relatively angularly disposed axis whereby to scan a portion of space, a voltage-controlled indicator, means operated in timed relation with movements of said antenna about a first axis for producing a voltage to control said indicator, means operated in timed relation to movements of said antenna about a second of said axes for varying said voltage whereby the position of said indicator is representative of the position of the directivity axis of said antenna, a radio transmitter and receiver connected with said antenna, means for blocking direct transmission of energy from said transmitter to said receiver, and means controlled by the energy received by said antenna from an object for effecting an indication by said indicator of the position of said antenna at the time said energy is received.

48. An object detecting system of the character recited in claim 47, in which the means operated in timed relation with movements of the antenna about the second axis serves to vary the amplitude of the control voltage.

49. In an object detecting system, apparatus for indicating the orientation of an object comprising a directional antenna, means for rotating the directivity axis of said antenna at an angle to and about an axis, means for varying the magnitude of the angle formed between said two axes, an indicator, means for causing said indicator to trace a path in synchronism with and corresponding to that traversed by said directivity axis, means for varying the radius of said path in accordance with variations in magnitude of the angle formed between said two axes, a radio transmitter and receiver connected with said antenna, means for blocking direct transmission of energy from said transmitter to said receiver, and means controlled by the energy received by said antenna for effecting an indication by said indicator of the position of said antenna at the time said energy is received.

50. In an object detecting system, apparatus for indicating the orientation of an object comprising a directional antenna, means for spirally scanning the directivity axis of said antenna over a portion of space, an indicator, means operable in time relation with movements of said antenna about the center of its spiral scan for supplying a pair of similar voltages periodically varying but substantially 90° out of phase with each other, means for varying the amplitudes of said voltages in accordance with variations in the radius of the path traversed by said antenna, a radio transmitter and receiver connected with said antenna, means for blocking direct transmission of energy from said transmitter to said receiver, and means controlled by the energy received by said antenna for effecting an indication by said indicator of the position of said antenna at the time said energy is received.

51. An object detecting system of the character recited in claim 50, in which the indicator comprises a cathode ray tube in which the electron beam traces a path on its screen in synchronism with the scanning of the antenna.

52. An object detecting system comprising a transmitter for producing a periodic pulse wave of electromagnetic energy, means for directionally radiating said pulse energy in spiral fashion over a predetermined portion of space, a receiver for receiving that potrion of said energy reflected from a distant object, blocking means for preventing direct transmission of energy from said transmitter to said receiver, a cathode ray tube, means for spirally scanning the cathode ray beam thereof in synchronism with the spiral radiation of said energy, and means responsive to received pulse energy for causing said beam to produce an indication of the orientation of said object with respect to said system.

53. The method of indicating the orientation of a distant object with respect to a predetermined axis comprising the steps of producing a periodic wave of electromagnetic energy, radiating said wave in a directional beam, rotating said beam about said axis, receiving energy reflected from said object, filtering the received energy by blocking out the radiated wave during transmission and blocking out other than the selected signal reflected from said object, generating a voltage of the same frequency as said rotation, and indicating the amplitude of the component of the modulation envelope of said received energy in phase with said voltage.

54. The method of indicating the orientation of a distant object with respect to a predetermined axis comprising the steps of producing a wave of electromagnetic energy, radiating said wave in a directional beam, rotating said beam about said axis, receiving energy reflected from said object, filtering the received energy by blocking out the radiated wave during transmission and blocking out other than the selected signal reflected from said object, generating a two-phase voltage of the same frequency as said rotation, and indicating the amplitude of the component of the modulation envelope of said received energy in phase with each of the two phases of said voltage.

55. The method of indicating the orientation of a distant object with respect to a predetermined directional axis comprising the steps of producing a wave of electromagnetic energy, radiating said wave in a directional beam having a longitudinal axis, directing said directional axis in the general direction of said object and rotating the longitudinal axis of said beam about said directional axis and at a small angle thereto, receiving energy reflected from said object, filtering the received energy by blocking out the radiated wave during transmission and blocking out other than the selected signal reflected from said object, resolving the amplitude value of the received energy into two components respectively measurable along rectilinear coordinates of the instantaneous position of the directional axis of said beam for said amplitude value, and indicating the resultant of said two components.

56. In a radio control system, scanning means having an axis and adapted to receive radiated energy, at least said scanning means or the radiated energy having a directional characteristic, means for rotating said characteristic about the axis of said scanning means, means including a gating circuit for filtering the received energy to eliminate therefrom all but the signal reflected from a selected object, means responsive to the filtered energy for indicating the range of an object from which said energy radiates, and means also responsive to said filtered energy for indicating the relative orientation of said scanner axis with respect to the orientation of said object alternately with respect to said range indication.

57. In a radio gun control system comprising scanner means for defining a radio line of sight, a gun computer adapted to determine gun aiming angles from present target position data set therein, means for selectively controlling said line of sight to track with said computer setting or with the orientation of a distant target, means for determining the lack of correspondence between said line of sight and said target orientation or between said line of sight and said computer setting, and means for setting said computer in accordance with the relative lack of correspondence between said line of sight and the orientation of said target.

58. In a radio gun control system comprising scanner means for defining a radio line of sight, a gun computer adapted to determine gun aiming angles from present target position data set therein, means for controlling said line of sight to track with said computer setting, means for determining the lack of correspondence between said line of sight and said target orientation, and means for setting said computer in accordance with the relative lack of correspondence between said line of sight and the orientation of said target.

59. The method of indicating the orientation of a distant object with respect to a predetermined directional axis comprising the steps of producing a periodic pulse wave of electromagnetic energy, radiating said wave in a directional beam having a longitudinal axis, directing said directional axis in the general direction of said object and rotating the longitudinal axis of said beam about said directional axis and at a small angle thereto, receiving pulses reflected from said object, generating a voltage of the same frequency as said rotation, and indicating the amplitude of the component of the modulation envelope of said received pulses in phase with said voltage.

60. The method of indicating the orientation of a distant object with respect to a predetermined directional axis comprising the steps of producing a periodic pulse wave of electromagnetic energy, radiating said wave in a directional beam having a longitudinal axis, directing said directional axis in the general direction of said object and rotating the longitudinal axis of said beam about said directional axis and at a small angle thereto, receiving pulses reflected from said object, generating a two phase voltage of the same frequency as said rotation, and indicating the amplitude of the component of the modulation envelope of said received pulses in phase with each of the two phases of said voltage.

61. A tracking indicating system comprising means for producing a wave of electromagnetic energy, means for radiating said wave in a beam, means for rotating said beam about an axis, means for receiving energy reflected from a distant object, means responsive to said received energy for indicating the relative displacement between said axis and said object orientation, and means also responsive to said received energy for simultaneously producing an indication of the range of said object, said displacement indicating means comprising a cathode ray tube and means for periodically displacing the beam thereof in accordance with said relative displacement, and said range indicating means comprising means alternately operative with respect to said displacement indicating means for indicating the wave envelope of said received energy.

62. In a radio searching and tracking system, means for producing a periodic pulse wave of radiant energy, means for radiating said wave in a beam, means for rotating said beam, means for receiving pulses reflected from a distant object, means for periodically blocking said receiving means in synchronism with said transmitted pulses for a predetermined portion of the period of said transmitted pulses, whereby the effects of extraneous noise waves are reduced, means responsive to said received pulses for indicating the range of said object during the unblocked condition of said receiving means, and means also responsive to said received pulses for indicating the relative displacement between said beam and said object during said blocked interval, said indicating means comprising a cathode ray tube, means for alternately producing said range and said displacement indications thereby during each period of the transmitted pulses, and means for preventing any indication by said tube for a predetermined interval during change-over between said indications.

63. In a radio searching and tracking system, means for producing a periodic pulse wave of radiant energy, means for radiating said wave in a beam, means for rotating said beam about a directivity axis, means for receiving pulses reflected from a distant object, means for periodically blocking said receiving means in synchronism with said transmitted pulses for a predetermined portion of the period of said transmitted pulses, whereby the effects of extraneous noise waves are reduced, means responsive to said received pulses for indicating the range of said object during the unblocked condition of said receiving means, and means also responsive to said received pulses for indicating the relative displacement between said directivity axis and said object during said blocked interval, said indicating means comprising a cathode ray tube, and means for alternately producing said range and said displacement indications on the cathode ray screen thereof during each period of the transmitted pulses.

CARL G. HOLSCHUH.
GIFFORD E. WHITE.
WALTER W. MIEHER.
JAMES E. SHEPHERD.

REFERENCES CITED

The following references are of record in the file of this patent:

UNITED STATES PATENTS

| Number | Name | Date |
|---|---|---|
| 1,924,174 | Wolf | Aug. 29, 1933 |
| 1,937,336 | Ford et al. | Nov. 28, 1933 |
| 2,003,661 | Bassett et al. | June 4, 1935 |
| 2,065,303 | Chafee et al. | Dec. 22, 1936 |
| 2,079,625 | Morgan | May 11, 1937 |
| 2,083,242 | Runge | June 8, 1937 |
| 2,098,287 | Gent | Nov. 9, 1937 |
| 2,176,469 | Moueix | Oct. 17, 1939 |
| 2,231,929 | Lyman | Feb. 18, 1941 |
| 2,235,826 | Chafee | Mar. 25, 1941 |
| 2,241,809 | De Forest | May 13, 1941 |
| 2,257,757 | Moseley | Oct. 7, 1941 |
| 2,263,377 | Busignies et al. | Nov. 18, 1941 |
| 2,268,643 | Crosby | Jan. 6, 1942 |
| 2,298,476 | Goldsmith | Oct. 13, 1942 |
| 2,334,247 | Busignies | Nov. 16, 1943 |
| 2,345,932 | Gould | Apr. 4, 1944 |
| 2,400,791 | Tolson et al. | May 21, 1946 |
| 2,404,527 | Potapenko | July 23, 1946 |
| 2,408,414 | Donaldson | Oct. 1, 1946 |
| 2,409,448 | Rost et al. | Oct. 15, 1946 |
| 2,409,462 | Zworykin et al. | Oct. 15, 1946 |
| 2,412,612 | Godet | Dec. 17, 1946 |
| 2,412,702 | Wolff | Dec. 17, 1946 |
| 2,423,104 | Labin | July 1, 1947 |
| 2,426,189 | Espenschied | Aug. 26, 1947 |
| 2,426,218 | Hopgood | Aug. 26, 1947 |
| 2,445,213 | Evans | July 13, 1948 |
| 2,473,175 | Ridenour | June 14, 1949 |

FOREIGN PATENTS

| Number | Country | Date |
|---|---|---|
| 406,903 | Great Britain | Mar. 8, 1934 |
| 455,765 | Great Britain | Oct. 27, 1936 |
| 497,147 | Great Britain | Dec. 9, 1938 |
| 526,658 | Great Britain | Sept. 23, 1940 |
| 108,556 | Australia | Sept. 14, 1939 |
| 812,975 | France | Feb. 15, 1937 |

OTHER REFERENCES

"The Cathode Ray Oscillograph in Radio Research" by R. A. Watson Watt, pages 89 to 91. Reprinted Nov. 1935.